(12) United States Patent
Beukema et al.

(10) Patent No.: US 10,686,643 B1
(45) Date of Patent: Jun. 16, 2020

(54) DISCRETE TIME ANALOG FRONT END CIRCUIT IMPLEMENTED IN A RECEIVER DEVICE

(71) Applicant: International Business Machines Corporation, Armonk, NY (US)

(72) Inventors: Troy James Beukema, Briarcliff Manor, NY (US); Martin Cochet, White Plains, NY (US); John Francis Bulzacchelli, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/291,322

(22) Filed: Mar. 4, 2019

(51) Int. Cl.
    *H04L 27/26* (2006.01)
    *H04L 27/00* (2006.01)
    *H04L 27/38* (2006.01)

(52) U.S. Cl.
    CPC ...... *H04L 27/3881* (2013.01); *H04L 27/0002* (2013.01); *H04L 27/2649* (2013.01)

(58) Field of Classification Search
    CPC ............. H04L 27/3881; H04L 27/0002; H04L 27/2649; H04L 375/348
    See application file for complete search history.

(56) References Cited

U.S. PATENT DOCUMENTS

| | | | |
|---|---|---|---|
| 5,724,363 A * | 3/1998 | Breya | H04L 1/22 714/708 |
| 8,213,491 B1 | 7/2012 | Arslan | |
| 8,964,825 B2 | 2/2015 | Beukema et al. | |
| 9,806,552 B2 | 10/2017 | Brannick et al. | |
| 2005/0275446 A1* | 12/2005 | Hairston | H03F 3/45475 327/336 |
| 2007/0092045 A1 | 4/2007 | Woo et al. | |
| 2013/0215954 A1* | 8/2013 | Beukema | G06G 7/184 375/233 |

FOREIGN PATENT DOCUMENTS

CN     103926568 B     8/2016

OTHER PUBLICATIONS

Zheng, et al., A 56 Gb/s 6 mW 300 um2 inverter-based CTLE for short-reach PAM2 applications in 16 nm CMOS, CICC, 2018, 4 pages.

(Continued)

*Primary Examiner* — Ted M Wang
(74) *Attorney, Agent, or Firm* — Amin, Turocy & Watson, LLP

(57) ABSTRACT

A device can comprise a peaked integrator circuit that generates an output signal from a continuous time signal based on a sub rate clock timing cycle. The device can further comprise a track and hold circuit coupled to the output of the peaked integrator that generates a held discrete time signal from the output of the peaked integrator based on a second sub rate clock timing cycle that is offset in time from the sub rate clock timing cycle by a single time unit interval. The device can further comprise an integrator circuit coupled to an output of the track and hold circuit that integrates the held discrete time signal, based on the second sub rate clock timing cycle that is offset in time from the sub rate clock timing cycle by a single time unit interval.

12 Claims, 14 Drawing Sheets

(56) References Cited

OTHER PUBLICATIONS

Bulzacchelli, et al., A 28-Gb/s 4-Tap FFE/15-Tap DFE Serial Link Transceiver in 32-nm SOI CMOS Technology, IEEE Journal of Solid-State Circuits, Dec. 2012, 17 Pages, vol. 47, No. 12.

Depaoli, et al., A 4.9pJ/b 16-to-64Gb/s PAM-4 VSR Transceiver in 28nm FDSOI CMOS, IEEE International Solid-State Circuits Conference, pp. 112-113, Feb. 2018.

Agrawal, et al., A 19Gb/s Serial Link Receiver with Both 4-Tap FFE and 5-Tap DFE Functions in 45nm SOI CMOS, International Solid-State Circuits Conference, Feb. 21, 2012, 3 Pages.

Park, et al., A 7Gb/s 9.3mW 2-Tap Current-Integrating DFE Receiver, IEEE International Solid-State Circuits Conference, 2007, pp. 230-231,599.

Norimatsu, et al., A 25Gb/s Multistandard Serial Link Transceiver for 50dB-Loss Copper Cable in 28nm CMOS, EEE International Solid-State Circuits Conference, 2016, 2016, pp. 60-63.

\* cited by examiner

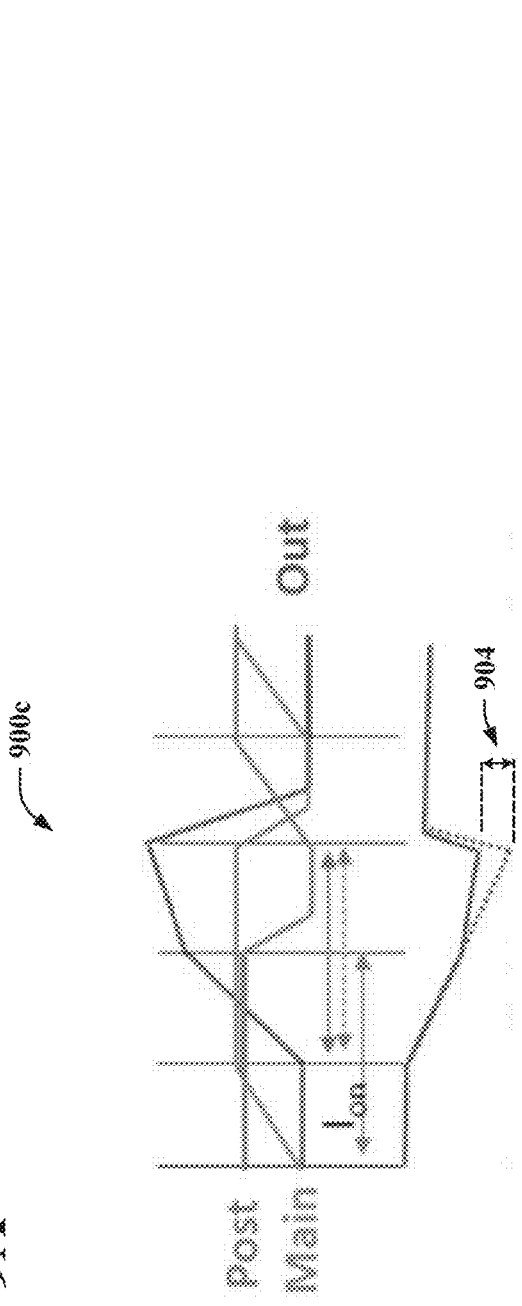
FIG. 9A
FIG. 9B
FIG. 9C

US 10,686,643 B1

DISCRETE TIME ANALOG FRONT END CIRCUIT IMPLEMENTED IN A RECEIVER DEVICE

STATEMENT REGARDING FEDERALLY SPONSORED RESEARCH OR DEVELOPMENT

This invention was made with Government support under Contract No.: DE-AC52-07NA27344 awarded by Department of Energy (DOE). The Government has certain rights in this invention.

BACKGROUND

The subject disclosure relates to discrete time circuits, and more specifically, to a discrete time analog front end circuit implemented in a receiver device.

DESCRIPTION OF RELATED ART

Receiver analog front ends are an integral part of modern serial input/output (I/O) data links which interconnect high speed integrated circuit devices such as switch/router chips or data processors in networking and computing systems. The analog front end is responsible for buffering and/or amplifying a received signal and typically also applying signal conditioning such as high frequency loss compensation prior to conversion of the signal to a digital domain representation with sampling devices where the data is recovered. State-of-the-art data interconnects use high data transmission rate, now approaching 50 to 100 Gb/s per data lane or even higher. This high data transmission rate requires corresponding wide signal bandwidth in the receiver analog front end. As a specific example, a system may be designed to convey information at a BAUD rate of 50 Gsymbols/second on a line, encoded with 4 level line modulation to achieve a net data throughput of 100 Gb/s. Bandwidth requirement for transmission at a specified baud rate is approximately BAUD/2, in the case of 50 Gbaud transmission it is 25 GHz. This high bandwidth must be supported by the receiver analog front end to avoid adding excessive inter-symbol interference (ISI) to the received signal and degrading received bit-error-rate (BER). To support this high bandwidth realization in modern CMOS integrated circuit technology used to realize the serial input/output function typically requires broadband analog circuit topologies incorporating well-known design techniques such as series or shunt inductive peaking and/or t-coil based circuits. These continuous-time analog broadband circuit techniques all require integrated inductors, which can add excessive chip area to the design in addition to unwanted second-order ringing distortion and unwanted parasitic coupling degradation to the data signal. Further, the broadband circuit realized may exhibit excessive bandwidth over process/voltage/temperature "corners" that the IC must function over. This excessive bandwidth can result in extra unwanted noise added to the received signal, again degrading recovered BER.

SUMMARY

To address the disadvantages of continuous-time broadband analog front end designs which may be employed in a high data rate receiver device, a new approach based on a sub-rate discrete-time sampling method is proposed. At a conceptual level, the new invention immediately samples the incoming signal to a sub-rate, discrete-time analog signal representation at its input. This approach avoids the need to pass the received signal through a broadband (e.g. 25 GHz) continuous-time amplifier. To achieve low noise, high gain, and high frequency signal conditioning (i.e. gain boost at BAUD/2, or 25 GHz in a modern high data rate receiver) at the same time, a novel front-end sampling structure based on a peaked integrator, followed by a sampled integrator, is used. This circuit topology avoids the use of any inductors, while providing needed signal bandwidth, inherently matched to the noise bandwidth of the transmit signal by the operation of the peaked integrator, to convey the data signal to subsequent discrete-time data condition/sampling circuits which recover the data.

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, and/or methods that can facilitate discrete time analog front end circuit components are described.

According to an embodiment, a device can comprise a peaked integrator circuit that generates an output signal from a continuous time signal based on a sub rate clock timing cycle. The device can further comprise a track and hold circuit coupled to the output of the peaked integrator that generates a held discrete time signal from the output of the peaked integrator based on a second sub rate clock timing cycle that is offset in time from the sub rate clock timing cycle by a single time unit interval. The device can further comprise an integrator circuit coupled to an output of the track and hold circuit that integrates the held discrete time signal, based on the second sub rate clock timing cycle that is offset in time from the sub rate clock timing cycle by a single time unit interval.

According to another embodiment, a method can comprise generating, by a peaked integrator circuit, an output signal from a continuous time signal based on a sub rate clock timing cycle. The method can further comprise holding, by a track and hold circuit, the output signal based on a second sub rate clock timing cycle that is offset in time from the sub rate clock timing cycle by a single time unit interval. The method can further comprise integrating, by an integrator circuit, a held output signal based on the second sub rate clock timing cycle.

According to another embodiment, a device can comprise a wireline device that receives a continuous time signal. The device can further comprise a discrete time analog frontend circuit, comprising a discrete time integrator circuit and a track and hold circuit, that conditions the continuous time signal based on at least two sub rate clock timing cycles.

DESCRIPTION OF THE DRAWINGS

FIG. 9A illustrates an electrical schematic of an example, non-limiting device that can facilitate discrete time analog front end circuit components in accordance with one or more embodiments described herein.

FIGS. 9B and 9C illustrate example, non-limiting timing diagrams that can facilitate discrete time analog front end circuit components in accordance with one or more embodiments described herein.

DETAILED DESCRIPTION

Figure 1A:
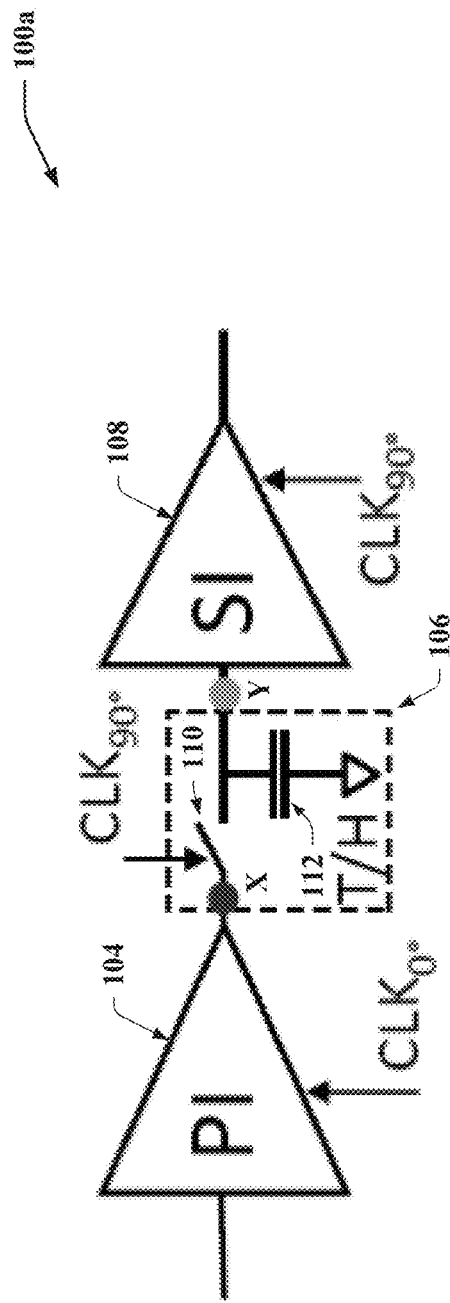
FIG. 1A illustrates a block diagram of an example, non-limiting device that can facilitate discrete time analog front end circuit components in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only.

According to multiple embodiments, the subject disclosure described herein and/or illustrated in the figures (e.g., device 100a, device 200a, device 300a, etc.) can constitute one or more components of an integrated circuit that can be fabricated in a semiconducting device. For example, the subject disclosure described herein and/or illustrated in the figures (e.g., device 100a, device 200a, device 300a, etc.) can constitute one or more components of an integrated circuit such as, for instance, a System on a Chip (SoC) device that can be fabricated in a complementary metal oxide semiconductor (CMOS) device.

In some embodiments, the subject disclosure described herein and/or illustrated in the figures (e.g., device 100a, device 200a, device 300a, etc.) can constitute one or more components of an integrated circuit that can be fabricated in a semiconducting device and implemented in a data communication device and/or a computing device. For example, the various embodiments of the subject disclosure described herein and/or illustrated in the figures (e.g., device 100a, device 200a, device 300a, etc.) can constitute one or more components of an integrated circuit (e.g., a SoC) that can be fabricated in a semiconducting device process (e.g., a CMOS device) that can be implemented in a data communication device including, but not limited to, a wireline device, a wireline receiver, a wireline transceiver, and/or another data communication device.

In some embodiments, fabrication of the various embodiments of the subject disclosure described herein and/or illustrated in the figures (e.g., device 100a, device 200a, device 300a, etc.) can comprise one or more multi-step sequences of, for example, photolithographic and/or chemical processing steps that can facilitate gradual creation of electronic-based systems, devices, components, and/or circuits in a semiconducting device (e.g., an integrated circuit such as, for instance, a SoC fabricated in a CMOS device). For example, the various embodiments of the subject disclosure described herein and/or illustrated in the figures (e.g., device 100a, device 200a, device 300a, etc.) can be fabricated by employing techniques including, but not limited to: photolithography, microlithography, nanolithography (e.g., a 7 nanometer (7 nm) lithography technology node), nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), physical vapor deposition (PVD), chemical vapor deposition (CVD), atomic layer deposition (ALD), plasma enhanced chemical vapor deposition (PECVD), chemical solution deposition, electroplating, molecular beam epitaxy (MBE), electrochemical deposition (ECD), lift-off techniques, chemical-mechanical planarization (CMP), backgrinding techniques, and/or another technique for fabricating an integrated circuit.

In some embodiments, fabrication of the various embodiments of the subject disclosure described herein and/or illustrated in the figures (e.g., device 100a, device 200a, device 300a, etc.) can be performed using various materials. For example, the various embodiments of the subject disclosure described herein and/or illustrated in the figures (e.g., device 100a, device 200a, device 300a, etc.) can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the subject disclosure described herein and/or illustrated in the figures (e.g., device 100a, device 200a, device 300a, etc.) can further comprise various computer and/or computing-based elements. In some embodiments, such computer and/or computing-based elements can be used in connection with implementing one or more of the systems, devices, components, and/or operations shown and described in connection with FIG. 1 or other figures disclosed herein.

As referenced herein, components that can be "electrically" coupled can be coupled via electrical circuitry. For example, the terms "electrical circuitry," "electronic circuitry," "electric circuitry," "circuitry," and/or the like, utilized herein to describe components that can be "electrically" coupled can refer to coupling such components via one or more electronic components (e.g., resistors, transistors, capacitors, inductors, diodes, etc.) that are interconnected by conductive wires and/or traces through which electric current can flow (e.g., alternating current (AC) and/or direct current (DC)). As employed herein, the terms "electrical circuitry," "electronic circuitry," "electric circuitry," "circuitry," and/or the like, can describe one or more electric circuits that can facilitate various operations (e.g., transferring, storing, and/or altering electrical current, electrical signals, and/or electrical data) of the various embodiments of the subject disclosure described herein and/or illustrated in the figures (e.g., device 100a, device 200a, device 300a, etc.).

FIG. 1A illustrates a block diagram of an example, non-limiting device 100a that can facilitate discrete time analog front end circuit components in accordance with one or more embodiments described herein. In some embodiments, device 100a can comprise a peaked integrator (PI) circuit 104, a track and hold (T/H) circuit 106, and/or an integrator circuit 108. In some embodiments, track and hold (T/H) circuit 106 can comprise a switch 110 and/or a capacitor 112. As referenced herein, a sampled integrator can comprise an integrator circuit preceded by a track and hold (T/H) circuit. Hence the combination of the track and hold (T/H) circuit 106 and integrator circuit 108 can form a full sampled integrator circuit, but for sake of clarity in the figures and rest of the text, the integrator circuit itself is labelled as SI.

According to multiple embodiments, peaked integrator (PI) circuit 104 can generate an output signal from a continuous time signal based on a sub rate clock timing cycle. For example, peaked integrator (PI) circuit 104 can generate an output signal (e.g., a sub rate analog signal) from a continuous time signal received by peaked integrator (PI) circuit 104, where peaked integrator (PI) circuit 104 can generate such an output signal (e.g., at node X) based on a sub rate clock timing cycle (e.g., a quarter rate clock timing cycle) generated by a clock (e.g., a clock generator, a crystal oscillator, an electronic oscillator, etc.) denoted $CLK_{0°}$ in FIG. 1A. In some embodiments, peaked integrator (PI) circuit 104 can be coupled to track and hold (T/H) circuit 106. For example, an output of peaked integrator (PI) circuit 104 can be electrically coupled to hold capacitor 112 via switch 110, where switch 110 can operate (e.g., open and/or close) based on a sub rate clock timing cycle (e.g., a quarter rate clock timing cycle) generated by a clock (e.g., a clock generator, a crystal oscillator, an electronic oscillator, etc.) denoted $CLK_{90°}$ in FIG. 1A. In some embodiments the input, intermediate and output signals can be single ended and/or differential.

Figure 1B:
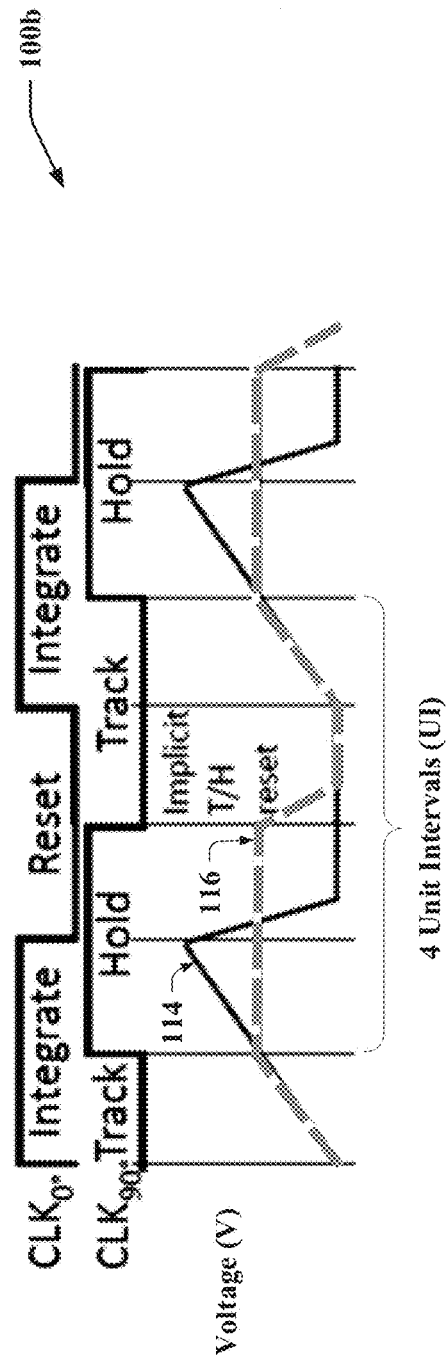
FIG. 1B illustrates an example, non-limiting timing diagram that can facilitate discrete time analog front end circuit components in accordance with one or more embodiments described herein.

According to multiple embodiments, track and hold (T/H) circuit 106 can track and/or hold an output signal generated by peaked integrator (PI) circuit 104. For example, in a tracking stage (e.g., when switch 110 is closed), peaked integrator (PI) circuit 104 can build on node X an output signal (e.g., a sub rate analog signal) that can electrically charge capacitor 112 of track and hold (T/H) circuit 106 in the tracking stage. In this example, at the end of the track period (e.g., at the beginning of a hold stage), track and hold (T/H) circuit 106 can hold the output signal at node Y constant for the duration of a holding stage (e.g., by opening switch 110 via clock $CLK_{90°}$) based on the electrical charge stored in capacitor 112 in the tracking stage. For instance, track and hold (T/H) circuit 106 can hold the output signal of peaked integrator (PI) circuit 104 constant at node Y for a certain multiple of a unit interval (e.g., 0.5UI, 1UI, 2UI, etc.), where such a unit interval (UI) can be the time period of a data transmission unit such as a channel symbol. In this example, a track period and a hold period combined can be a multiple of 1UI (e.g., T+H=4UI in a quarter-rate architecture as depicted in FIG. 1B). In some embodiments, by holding the output signal of peaked integrator (PI) circuit 104 as described above, track and hold (T/H) circuit 106 can generate a held discrete time signal.

In some embodiments, for example, embodiments employing high sample rates (e.g., 25 to 64 G sample/s), capacitor 112 can comprise a capacitor having a capacitance value ranging from approximately 10 femtofarads (fF) to approximately 50 fF. In some embodiments, the held signal at node Y (e.g., obtained from tracking the output signal of peaked integrator (PI) circuit 104) can be integrated and/or used at another stage. For example, the held signal at node Y can be used by integrator circuit 108 as described below.

According to multiple embodiments, integrator circuit 108 can be coupled to peaked integrator (PI) circuit 104. For example, an input of integrator circuit 108 can be electrically coupled to an output of peaked integrator (PI) circuit 104 via track and hold (T/H) circuit 106. In some embodiments, integrator circuit 108 can integrate a held signal derived from an output signal of peaked integrator (PI) circuit 104 based on a sub rate clock timing cycle that is offset in time from the sub rate clock timing cycle of clock $CLK_{0°}$ by a single time unit interval. For example, integrator circuit 108 can integrate an output signal (e.g., a sub rate analog signal)

of peaked integrator (PI) circuit 104 based on a sub rate clock timing cycle (e.g., a quarter rate clock timing cycle) generated by clock $CLK_{90°}$.

In some embodiments, to facilitate integrating an output signal of peaked integrator (PI) circuit 104 based on such a sub rate clock timing cycle described above (e.g., a quarter rate clock timing cycle generated by clock $CLK_{90°}$), integrator circuit 108 can integrate the output Y of track and hold (T/H) circuit 106, where Y is alternately tracking the output of the peaked integrator 104, or holding a constant signal. For example, the held signal at node Y can represent a sample of the output signal of peaked integrator (PI) circuit 104. In this example, integrator circuit 108 can integrate the held signal at node Y based on sub rate clock timing cycle (e.g., a quarter rate clock timing cycle) generated by clock $CLK_{90°}$ (e.g., as illustrated in FIG. 1B).

FIG. 1B illustrates an example, non-limiting timing diagram 100b that can facilitate discrete time analog front end circuit components in accordance with one or more embodiments described herein. Repetitive description of like elements and/or processes employed in various embodiments described herein is omitted for sake of brevity.

According to multiple embodiments, timing diagram 100b can represent a timing diagram corresponding to implementation (e.g., operation) of device 100a described above with reference to FIG. 1A. In some embodiments, timing diagram 100b can comprise voltage value 114, which can correspond to voltage at node X, and voltage value 116, which can correspond to voltage at node Y. In some embodiments, changes in voltage value 114 and/or voltage value 116 can occur over one or more unit intervals (UI) and/or multiples thereof (e.g., 0.5UI, 1UI, 2UI, etc.). For example, as illustrated in FIG. 1B, in a quarter-rate architecture the T+H time corresponds to 4UI and the $CLK_{0°}$ and $CLK_{90°}$ are offset by 1UI.

In some embodiments, to improve signal gain, peaked integrator (PI) circuit 104 can perform an integration of the input signal for a long enough time window. However, in these embodiments, an integration longer than one unit interval (e.g. 2UI) can result in a degraded frequency response (e.g. a zero at the half baud frequency in the case of a 2UI integration). Hence, in these embodiments, optimal integration duration can be one UI (1UI), which can be performed through an explicit signal (e.g. clock signal) of one UI pulse width. However, in these embodiments, at high frequencies, generating such a narrow pulse can result in major power constraints. In these embodiments, the proposed approach relying on an offset clock (e.g. 1UI offset) between peaked integrator (PI) circuit 104 and track and hold (T/H) circuit 106 can provide an effective integration of one UI without requiring any one UI wide clock pulses. Indeed, in these embodiments, as illustrated in FIG. 1B, such a clocking offset can result in the node Y tracking the output of peaked integrator (PI) circuit 104 during half of a cycle of clock $CLK_{90°}$, yet this time interval overlaps in part with the time interval in which the output of peaked integrator (PI) circuit 104 is reset. Hence, in these embodiments, the tracking period only partly overlaps with the integration phase of peaked integrator (PI) circuit 104. In these embodiments, when track and hold (T/H) circuit 106 switches to hold mode, the held signal at node Y can correspond to the value output of peaked integrator (PI) circuit 104 integrated for the duration of a fraction of a cycle of clock $CLK_{0°}$ (e.g., a quarter of a clock cycle, for example, 1UI for a quarter-rate embodiment), without requiring a shorter width clock signal for peaked integrator (PI) circuit 104 and/or track and hold (T/H) circuit 106. Conversely, in some embodiments, the signal at node Y (e.g., voltage value 116) of track and hold (T/H) circuit 106 can be reset in a fraction of a clock cycle without requiring a shorter width clock signal or an explicit reset signal, as denoted by "Implicit T/H reset" on FIG. 1B.

Figure 1D:
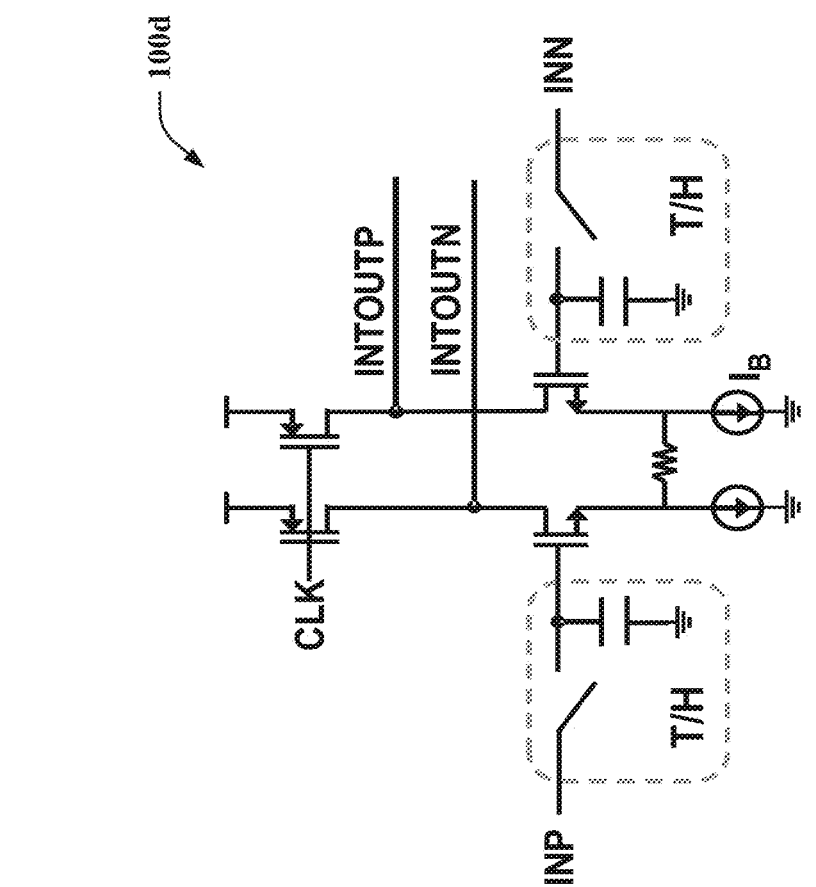
FIGS. 1C and 1D illustrate electrical schematics of example, non-limiting devices that can facilitate discrete time analog front end circuit components in accordance with one or more embodiments described herein.
Figure 1C:
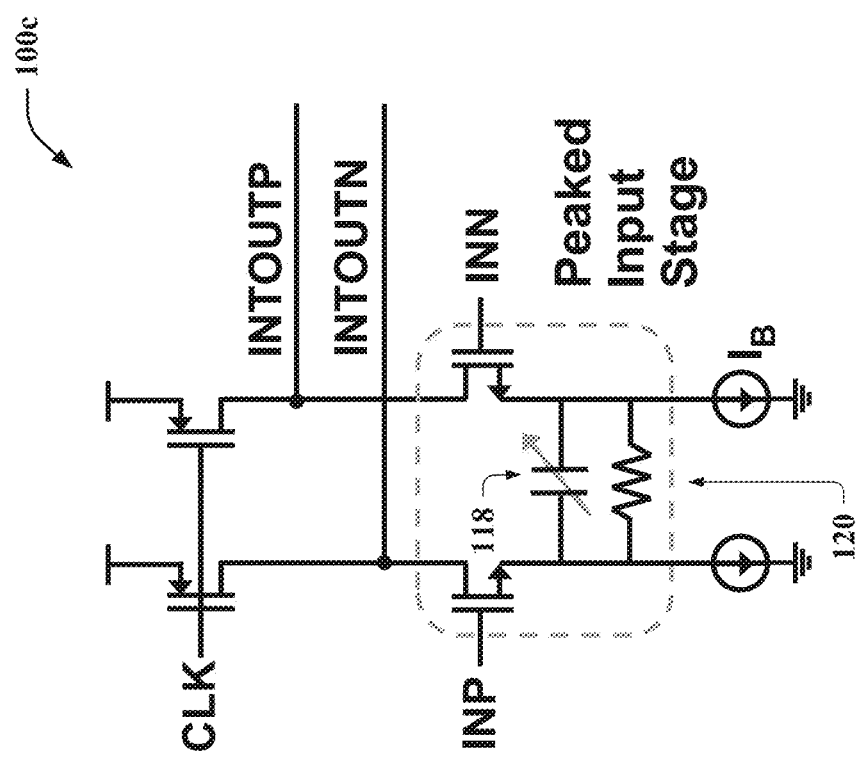

FIGS. 1C and 1D illustrate electrical schematics of example, non-limiting devices 100c, 100d that can facilitate discrete time analog front end circuit components in accordance with one or more embodiments described herein. Repetitive description of like elements and/or processes employed in various embodiments described herein is omitted for sake of brevity.

In some embodiments, device 100c can comprise an example, non-limiting implementation of peaked integrator (PI) circuit 104. In some embodiments, during reset stage (e.g., CLK=0) the output nodes INTOUTP and INTOUTN can be reset to the supply level. In some embodiments, during the integration stage, the differential input INP/INN can be applied to the metal-oxide-semiconductor (MOS) differential pair to steer the bias current $I_B$, which can result in a differential voltage at the output that can be proportional to the integral of the input signal. In some embodiments, a degeneration capacitor 118 and a resistor 120 can provide a control of the differential gain and a peaking function.

In some embodiments, device 100d can comprise an example, non-limiting implementation of track and hold (T/H) circuit 106 and integrator circuit 108. In some embodiments, T/H of device 100d can comprise track and hold (T/H) circuit 106. In some embodiments, integrator circuit 108 (e.g., device 100d) can be built using similar principle as device 100c as described above with reference to FIG. 1C, except in device 100d, degeneration capacitor 118 can be removed because the peaking function is not applicable in that stage (held input).

Figure 2A:
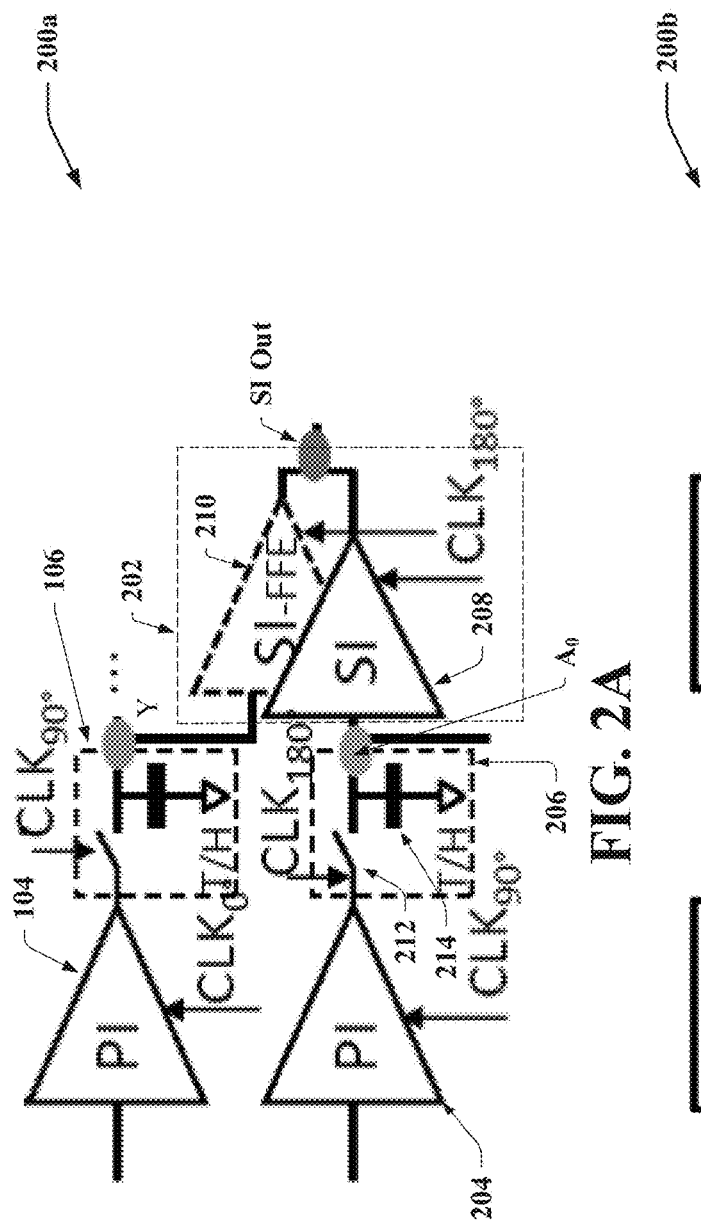
FIG. 2A illustrates a block diagram of an example, non-limiting device that can facilitate discrete time analog front end circuit components in accordance with one or more embodiments described herein.

FIG. 2A illustrates a block diagram of an example, non-limiting device 200a that can facilitate discrete time analog front end circuit components in accordance with one or more embodiments described herein. Repetitive description of like elements and/or processes employed in various embodiments described herein is omitted for sake of brevity.

In some embodiments, device 200a can comprise an example, non-limiting alternative embodiment of device 100a, where device 200a can comprise a feed forward equalizer (FFE) integrator circuit 202 coupled (e.g., electrically) to an output of one or more track and hold (T/H) circuit 106 and track and hold (T/H) circuit 206 (e.g., at nodes Y and node $A_0$, as depicted in FIG. 2A). In some embodiments, device 200a and/or feed forward equalizer (FFE) integrator circuit 202 can provide additional peaking, while operating based on a 50 percent (50%) duty-cycle clock (e.g., based on a sub rate clock timing cycle generated by clock $CLK_{180°}$ as depicted in FIG. 2A, where $CLK_{180°}$ can be offset from $CLK_{90°}$ and $CLK_{0°}$ for example by 1UI and 2UI respectively).

In some embodiments, device 200a can comprise a peaked integrator (PI) circuit 204 coupled (e.g., electrically via switch 212) to hold capacitor 214. In some embodiments, peaked integrator (PI) circuit 204 can comprise an example, non-limiting second instantiation of peaked integrator (PI) circuit 104, where peaked integrator (PI) circuit 204 can operate based on a sub rate clock timing cycle that is offset (e.g., by a single time unit interval) from the sub rate clock timing cycle employed on peaked integrator (PI) circuit 104. For example, peaked integrator (PI) circuit 204 can operate based on a sub rate clock timing cycle generated by clock $CLK_{90°}$ as depicted in FIG. 2A.

In some embodiments, track and hold (T/H) circuit 206 can comprise an example, non-limiting second instantiation of track and hold (T/H) circuit 106, where track and hold (T/H) circuit 206 can comprise a switch 212 and hold capacitor 214. In some embodiments, switch 212 can operate (e.g., open and/or close) based on a sub rate clock timing cycle that is offset (e.g., by a single time unit interval) from that of clock $CLK_{90°}$. For example, switch 212 can operate based on a sub rate clock timing cycle generated by clock $CLK_{180°}$ as depicted in FIG. 2A.

In some embodiments, device 200a can comprise an integrator circuit 208 (e.g., denoted as SI in the figures of the subject disclosure) coupled (e.g., electrically) to an output of track and hold (T/H) circuit 206 (e.g., at node $A_0$ as depicted in FIG. 2A). In some embodiments, integrator circuit 208 can comprise an example, non-limiting second instantiation of integrator circuit 108, where integrator circuit 208 can operate based on a sub rate clock timing cycle that is offset (e.g., by a single time unit interval) from the sub rate clock timing cycle employed on integrator circuit 108. For example, integrator circuit 208 can operate based on a sub rate clock timing cycle generated by clock $CLK_{180°}$ as depicted in FIG. 2A.

In some embodiments, feed forward equalizer (FFE) integrator circuit 202 can comprise a post cursor integrator circuit 210 (SI-FFE) coupled (e.g., electrically) to an output of track and hold (T/H) circuit 106 (e.g., at node Y as depicted in FIG. 2A). In some embodiments, the output of post cursor integrator circuit 210 can be coupled to an output of integrator circuit 208 (e.g., at node SI Out as depicted in FIG. 2A). In some embodiments, post cursor integrator circuit 210 can operate based on a sub rate clock timing cycle that is the same as that which can operate integrator circuit 208. For example, post cursor integrator circuit 210 can operate based on the sub rate clock timing cycle generated by clock $CLK_{180°}$ as depicted in FIG. 2A.

Figure 2B:
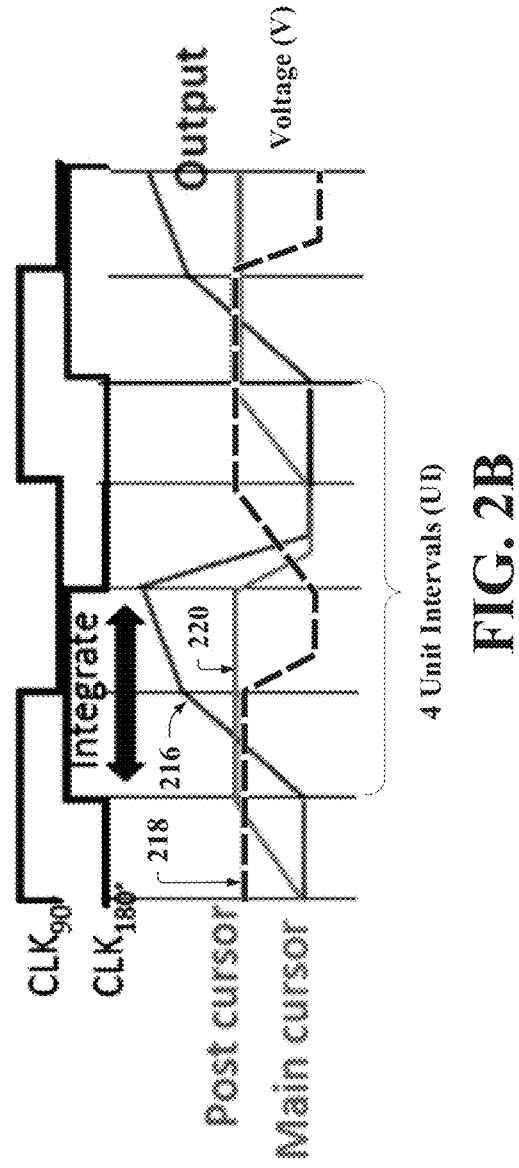
FIG. 2B illustrates an example, non-limiting timing diagram that can facilitate discrete time analog front end circuit components in accordance with one or more embodiments described herein.

FIG. 2B illustrates an example, non-limiting timing diagram 200b that can facilitate discrete time analog front end circuit components in accordance with one or more embodiments described herein. Repetitive description of like elements and/or processes employed in various embodiments described herein is omitted for sake of brevity.

According to multiple embodiments, timing diagram 200b can comprise an example, non-limiting alternative embodiment of timing diagram 100b, where timing diagram 200b can represent a timing diagram corresponding to implementation (e.g., operation) of device 200a described above with reference to FIG. 2A. In some embodiments, timing diagram 200b can comprise: voltage value 216, which can correspond to voltage at node SI Out; voltage value 218, which can correspond to voltage at node Y; and voltage value 220, which can correspond to voltage at node $A_0$. In some embodiments, changes in voltage value 216, voltage value 218, and/or voltage value 220 can occur over one or more unit intervals (UI) and/or multiples thereof (e.g., 0.5UI, 1UI, 2UI, etc.). For example, in a quarter-rate embodiment, in a manner similar to the timing described in FIG. 1B, the period of the clock $CLK_0$, clock $CLK_{90}$ and/or clock $CLK_{180}$ can be 4UI, and the integration time, as illustrated in FIG. 2B, can be 2UI.

According to multiple embodiments, the inputs of peaked integrator (PI) circuits 104, 204 can be connected to the data input of the device and the clock signals operating peaked integrator (PI) circuits 104, 204, track and hold (T/H) circuits 106, 206 respectively, can be offset in time (e.g., by one UI), hence the held output signals of track and hold (T/H) circuits 106, 206 can represent two subsequent data inputs. Hence, in some embodiments, the SI device of device 200a (e.g., integrator circuit 208) and SI-FFE device of device 200a (e.g., post cursor integrator circuit 210) can generate signals corresponding respectively to the main and first post cursor of the FFE filter, which are summed on the node "SI Out".

In some embodiments, because the signals 218 and 220 can be offset by a delay equal to a fraction of the clock cycle (e.g., a single UI), the FFE function can be performed without requiring a clock signal with an altered pulse width. In some embodiments, as illustrated in FIG. 2B, during the first fraction of the SI Out integration time, both the main cursor signal (e.g., voltage value 220) and the post cursor signal (e.g., voltage value 218) can be held, hence integration slope of the output signal (e.g., voltage value 216) can comprise a weighted sum of the main and post cursor signals. In some embodiments, during the second fraction of the SI Out integration time, only the main cursor signal (e.g., voltage value 220) can be present at the input of feed forward equalizer (FFE) integrator circuit 202, as the post cursor signal (e.g., voltage value 218) is being reset.

Figure 3A:
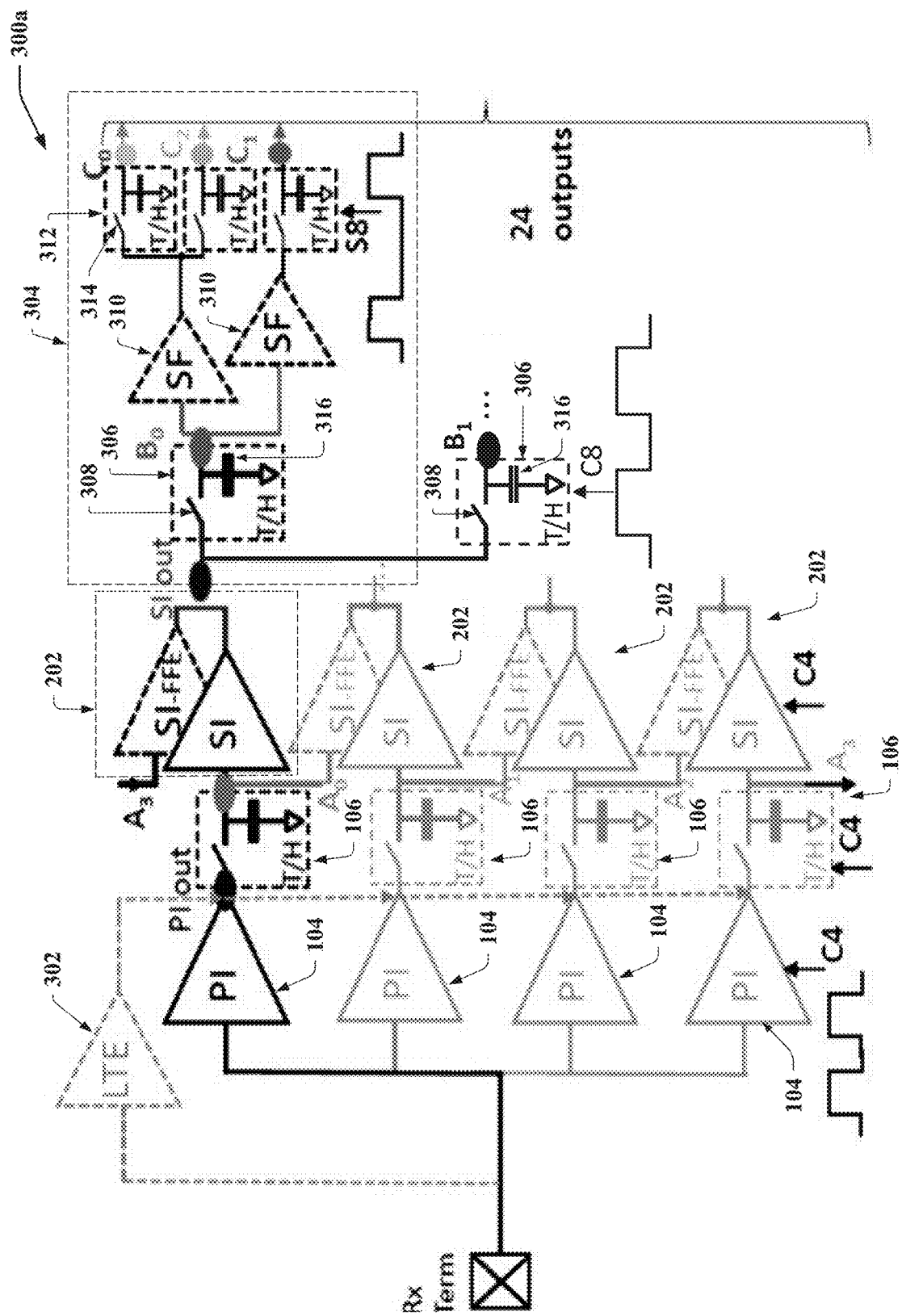
FIG. 3A illustrates a block diagram of an example, non-limiting device that can facilitate discrete time analog front end circuit components in accordance with one or more embodiments described herein.

FIG. 3A illustrates a block diagram of an example, non-limiting device 300a that can facilitate discrete time analog front end circuit components in accordance with one or more embodiments described herein. Repetitive description of like elements and/or processes employed in various embodiments described herein is omitted for sake of brevity.

In some embodiments, device 300a can comprise an example, non-limiting alternative embodiment of device 100a and/or device 200a, where device 300a can comprise a low frequency equalizer circuit 302 and/or a deserialization and signal delay circuit 304. In some embodiments, low frequency equalizer circuit 302 can comprise a long tail equalizer circuit (e.g., denoted LTE in FIG. 3A), where low frequency equalizer circuit 302 input can be coupled (e.g., electrically) to an input of peaked integrator (PI) circuit 104, and/or in some embodiments, the LTE output can be coupled to one or more of the output of peaked integrator (PI) circuits 104 (e.g., as depicted in FIG. 3A) and/or to one or more of the output of feed forward equalizer (FFE) integrator circuits 202.

In some embodiments, deserialization and signal delay circuit 304 can comprise one or more track and hold (T/H) circuits 306, which can comprise example, non-limiting alternative embodiments of track and hold (T/H) circuit 106, where track and hold (T/H) circuits 306 can comprise a switch 308 and a capacitor 316. In some embodiments, an output of the feed forward equalizer (FEE) integrator circuit 202 (e.g., node SI Out) is connected to the input of one or more (e.g., two) track and hold circuits 306. In some embodiments, the output of track and hold (T/H) circuits 306 can be coupled (e.g., electrically) to an input of one or more voltage buffers such as, for instance, source followers (SF) circuits 310 (e.g., at nodes $B_0$ and/or $B_1$ as depicted in FIG. 3A). In some embodiments, track and hold (T/H) circuits 306 connected to nodes B0 and B1 can operate with opposite polarity clocks, where, for example, one of the circuits is in track mode while the other is in hold mode. In some embodiments, an output of each source follower (SF) circuit 310 can be coupled to an input of one or more track and hold (T/H) circuits 312. In some embodiments, outputs of device 300a and/or track and hold (T/H) circuits 312 can comprise a total quantity of 24 outputs (e.g., as illustrated by nodes $C_0$, $C_1$, $C_2$, etc. in FIG. 3A).

In some embodiments, deserialization and signal delay circuit 304 can operate based on a sub rate timing cycle that is different from that of device 100a and/or device 200a described above with reference to FIGS. 1A and 2A. For example, deserialization and signal delay circuit 304 can operate based on an eighth rate (1/8) sub rate timing cycle as depicted in FIG. 3A, where C4 represents a quarter rate timing cycle (1/4) and C8 represents an eighth rate (1/8) timing cycle. In some embodiments, track and hold (T/H) circuits 312 can operate on the same sub-rate but with a different duty cycle than track and hold (T/H) circuits 306, e.g. in an eighth rate sub rate timing cycle, track and hold (T/H) circuits 312 can employ a track time of 2UI and a hold time of 6UI.

In some embodiments, device 300a can comprise an example, non-limiting alternative embodiment of device 100a and/or device 200a, where device 300a can comprise a single low frequency equalizer circuit 302 coupled to multiple of each such device 100a and/or device 200a. For example, as depicted by the gray dashed line work in FIG. 3A, device 300a can comprise a single low frequency equalizer circuit 302 coupled (e.g., electrically) to multiple devices 200a (e.g., multiple peaked integrator (PI) circuits 104, multiple track and hold (T/H) circuits 106, etc.), which can be coupled (e.g., electrically) to multiple deserialization and signal delay circuits 304.

Figure 4:
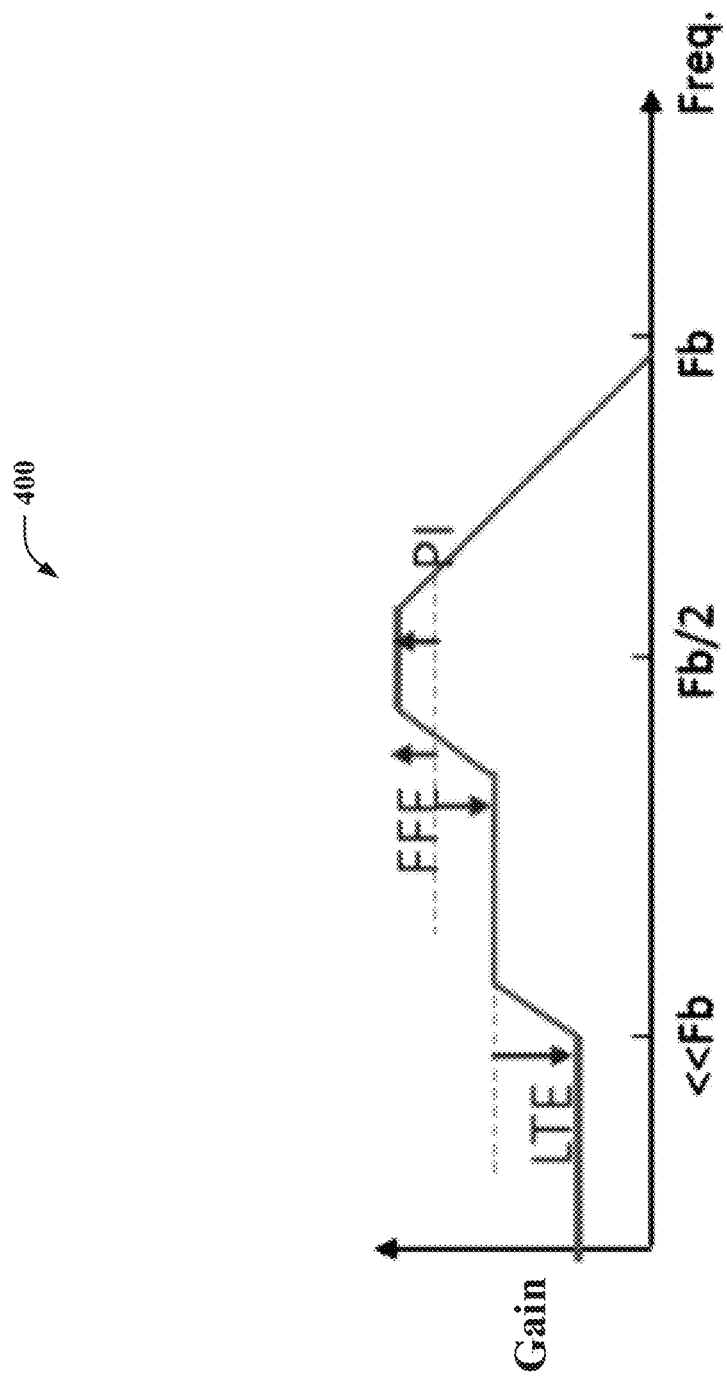
FIG. 4 illustrates an example, non-limiting frequency response diagram that can facilitate discrete time analog front end circuit components in accordance with one or more embodiments described herein.

In some embodiments, device 300a can comprise a discrete time analog frontend (DTAFE) circuit, which can comprise an optional active or passive inductor-less long tail equalizer (LTE) operating in parallel of a sub-rate discrete time integrator (DTI), for example, as illustrated in FIG. 3A. In some embodiments, such a DTI can comprise a peaked integrator (PI) which can perform 1UI integration, followed by a track and hold (T/H) and integrators (SI) which can provide additional gain and peaking through an optional two-tap FFE (FFE2). In some embodiments, an optional T/H stage, followed by Source Followers (SF) can deserialize a signal to a lower rate and provide delayed signals for an optional subsequent FFE stage. Alternatively, or additionally, in some embodiments, the SI output can be directly connected to sampling latches. In some embodiments, device 300a can provide the same signal conditioning as conventional active continuous time linear equalizer (CTLE) and/or variable gain amplifier (VGA) circuits, with relaxed bandwidth constraints (e.g., as illustrated in FIG. 4).

Figure 3B:
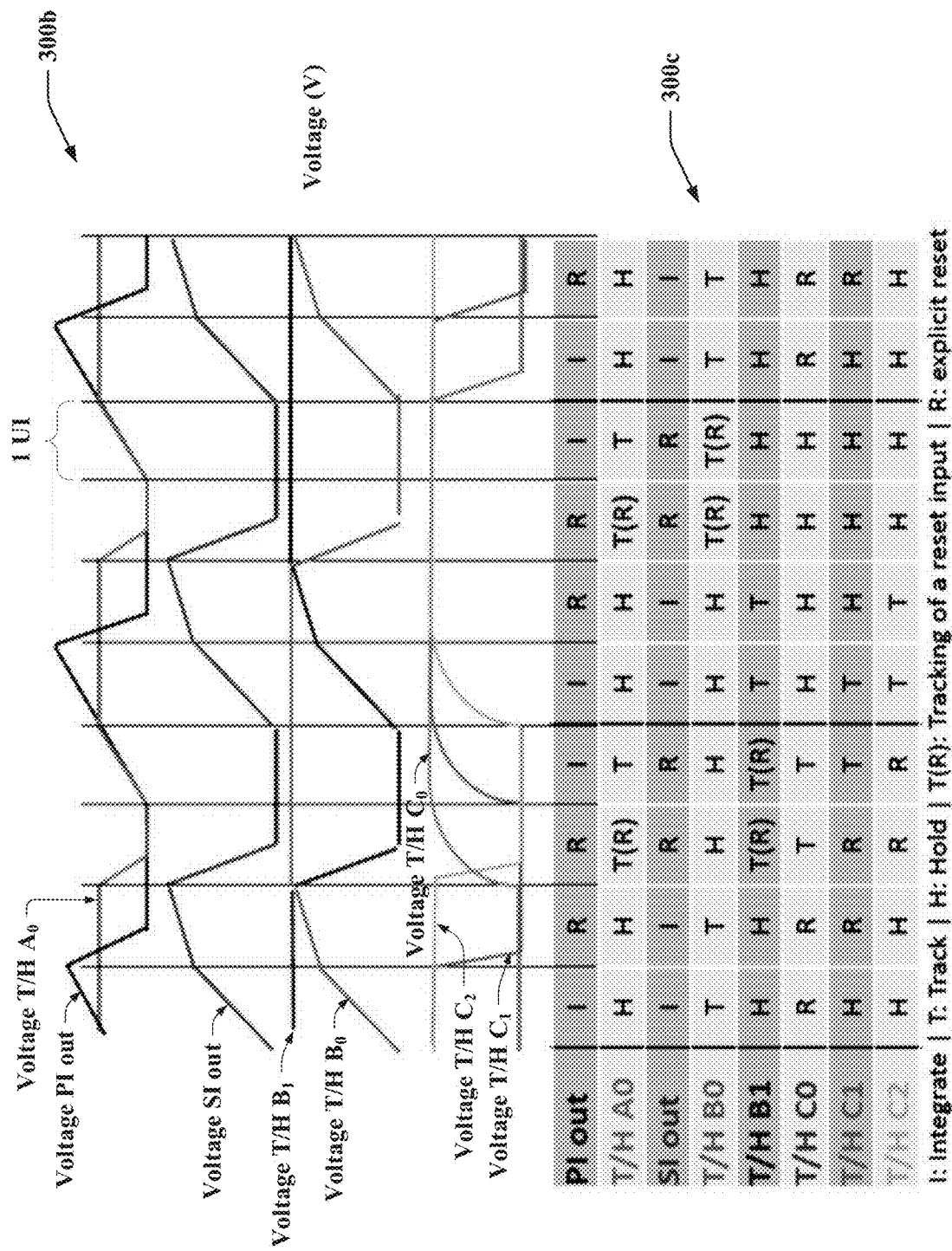
FIG. 3B illustrates an example, non-limiting timing diagram that can facilitate discrete time analog front end circuit components in accordance with one or more embodiments described herein.

FIG. 3B illustrates an example, non-limiting timing diagram 300b that can facilitate discrete time analog front end circuit components in accordance with one or more embodiments described herein. Repetitive description of like elements and/or processes employed in various embodiments described herein is omitted for sake of brevity.

According to multiple embodiments, timing diagram 300b comprises an example, non-limiting alternative embodiment of timing diagram 100b and/or timing diagram 200b, where timing diagram 300b can represent a timing diagram corresponding to implementation (e.g., operation) of device 300a described above with reference to FIG. 3A. In some embodiments, timing diagram 300b can comprise voltage values corresponding to various nodes of device 300a. For example, timing diagram 300b can comprise voltage values including, but not limited to, voltage PI out, voltage T/H $A_0$, voltage SI Out, voltage T/H $B_0$, voltage T/H $B_1$, voltage T/H $C_0$, voltage T/H $C_1$, voltage T/H $C_2$, and/or another voltage value corresponding to another node of device 300a. In some embodiments, chart 300c, placed below timing diagram 300b in FIG. 3B illustrates corresponding operating modes of the different circuits of device 300a (e.g., integration, tracking, holding, tracking of a reset input, and/or explicit reset, as depicted in FIG. 3B).

In some embodiments, timing diagram 300b and chart 300c present an example of operation for a quarter-rate/eighth-rate system. In some embodiments, PI out, T/H A0, and SI Out can operate on a 4UI period, while T/H B0, T/H B1, T/H C0, T/H C1, T/H C2 can operate on an 8UI period. Similarly, in some embodiments, to the case described in FIGS. 1B and 2B, the PI alternates 2UI of integration (I) and 2 UI of reset (R), the T/H A0 alternates between 2UI track (T) and 2UI hold (H) with a 1UI offset from the PI out, resulting in 1UI of effective integration and 1UI of implicit reset (T(R)). In some embodiments, during integration, the output of the SI is tracked either by T/H B0 or T/H B1 for 2UI, offering the quarter-rate to eighth-rate demultiplexing. In some embodiments, a similar 2UI implicit reset (T(R)) of the T/H B0 and T/H B1 makes their operation compatible with 50% duty-cycle clocking. In some embodiments, T/H C0, T/H C1, and T/H C2 can operate on a 2UI reset (R) 2UI track (T) and 4UI hold (H) on the same output of T/H B0 or T/H B1. In these embodiments, this produces three held copies T/H C0, T/H C1, and T/H C2 of the same signal, staggered by 1UI, which provides a WI time interval where at least one copy of the signal is available, facilitating further FFE operation.

In an embodiment, two or more voltage buffers can be used with at least one of the voltage buffers being connected to two or more track and hold circuits of different phases in such a way that at most one of the two track and hold circuits is tracking the output of the buffer at a given time, which reduces partial settling issues, or the need for a larger number of voltage buffers.

FIG. 4 illustrates an example, non-limiting diagram 400 that can facilitate discrete time analog front end circuit components in accordance with one or more embodiments described herein. Repetitive description of like elements and/or processes employed in various embodiments described herein is omitted for sake of brevity.

In some embodiments, diagram 400 can represent a sketch view of the expected frequency response and tuning parameters corresponding to device 300a described above with reference to FIG. 3A. In some embodiments, the LTE can provide a de-emphasis at low frequencies, the PI tail capacitance can provide peaking in the range of the half-baud frequency (Fb/2), and the FFE can provide de-emphasis at frequencies lower than Fb/2 and/or increase in overall gain, by means of changing the post cursor and main cursor FFE coefficients. In some embodiments, such levels, as well as the overall gain can be programmed by changing the biasing and degeneration of the PI and SI (e.g., as depicted in FIGS. 1C and 1D).

Figure 5A:
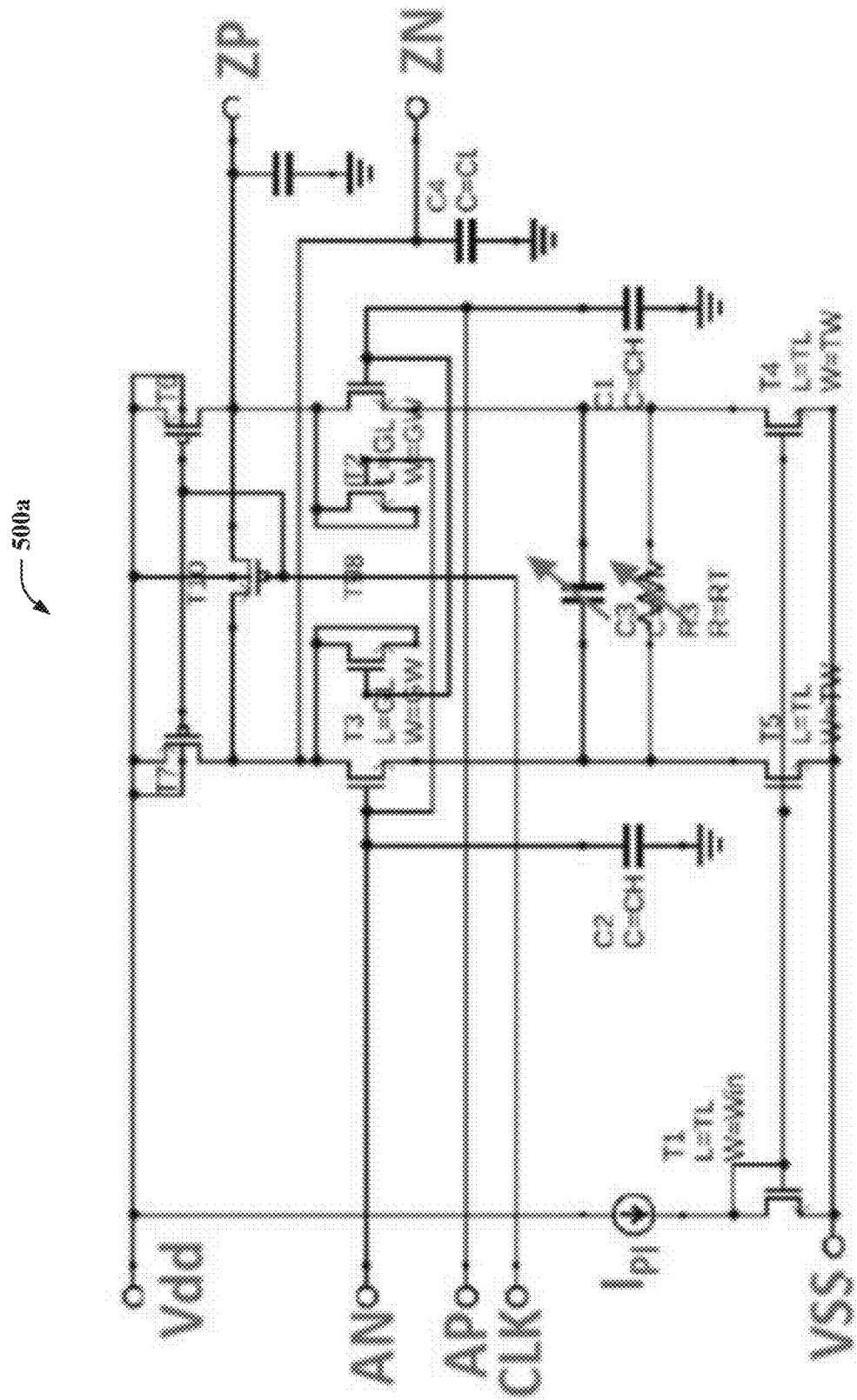
FIG. 5A illustrates an electrical schematic of an example, non-limiting device that can facilitate discrete time analog front end circuit components in accordance with one or more embodiments described herein.

FIG. 5A illustrates an electrical schematic of an example, non-limiting device 500a that can facilitate discrete time analog front end circuit components in accordance with one or more embodiments described herein. Repetitive description of like elements and/or processes employed in various embodiments described herein is omitted for sake of brevity.

In some embodiments, FIG. 5A can represent a schematic of the PI described above with peaking and gain tuning, where the integrator schematic can be similar, excluding the degeneration capacitor C3 depicted in FIG. 5A. In some embodiments, device 500a can facilitate tunability of, for example, the basic circuit of the PI and SI described above. In some embodiments, the PI gain and peaking can be tuned for example by a combination of coarse switching of the degeneration R,C. In some embodiments, the common mode of each stage can be affected by process voltage temperature aging (PVTA) variations, which can be compensated by changing the tail currents (e.g., denoted $I_{SI}$, $I_{SIFFE}$ in FIG. 5B as well as the tail current of peaked integrator (PI) circuit 104, $I_{PI}$). In some embodiments, current injecting $I_{INJ}$ can be used to keep common mode constant while tap weights are changed, and to improve gain for a given common mode drop. In some embodiments, the main and pre/post cursor taps can be changed in opposition to keep a constant $I_{SI}+I_{SIFFE}$ of FIG. 5B, hence a constant $I_{INJ}$. In other embodiments, the subject disclosure (e.g., device 100a, 200a, 300a, 500b, etc.) can keep the main tap $I_{SI}$ constant, and increase $I_{INJ}$ when $I_{SIFFE}$ increases, which can result in a lower power for smaller equalization levels (e.g., when $I_{SIFFE}$ is lower) as well as providing decoupling of both FFE taps weights and common mode level.

Figure 5B:
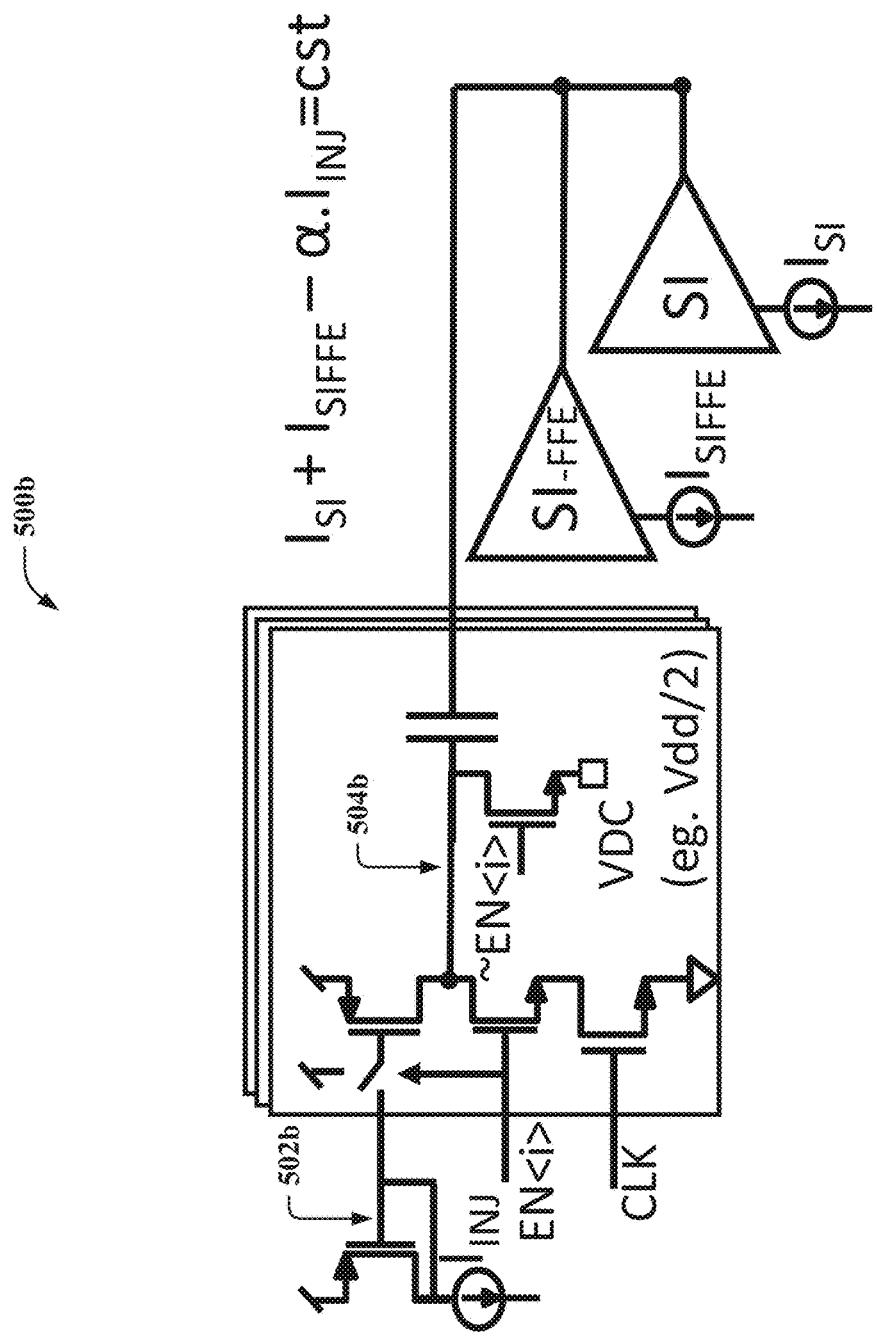
FIG. 5B illustrates a block diagram of an example, non-limiting device that can facilitate discrete time analog front end circuit components in accordance with one or more embodiments described herein.

FIG. 5B illustrates a block diagram of an example, non-limiting device 500b that can facilitate discrete time analog front end circuit components in accordance with one or more embodiments described herein. Repetitive description of like elements and/or processes employed in various embodiments described herein is omitted for sake of brevity.

In some embodiments, FIG. 5B can represent a block diagram and plot of a biasing scheme at the output of the SI node. In some embodiments, FIG. 5B can represent schematics and description of a capacitively coupled current injector. In some embodiments, the common-mode level can be sensed (e.g., measured). In some embodiments, such an approach can comprise the addition of segmenting (e.g., denoted as <i> in FIG. 5B). In some embodiments, the segments that are not enabled (EN<i>=0) can be set so that the direct current (DC) level of voltage on net 504b is set at the mid-rail (e.g., denoted as Vdd/2 in FIG. 5B) so that the swing of the signal net 504b around the DC point does not result in any voltage getting significantly above Vdd or below ground, which would be detrimental for correct operation. In some embodiments, due to the ratio of the mirror circuit 502b and non-idealities in the capacitive coupling the circuit produces an output alma, where a is the mirroring and non-ideality factor.

Figure 6A:
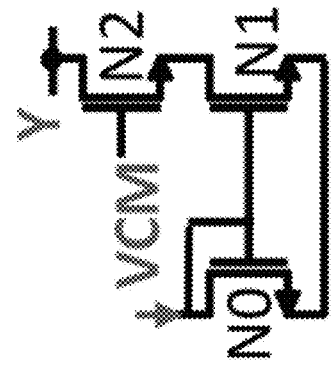
FIG. 6A illustrates a block diagram of an example, non-limiting device that can facilitate discrete time analog front end circuit components in accordance with one or more embodiments described herein.
Figure 6B:
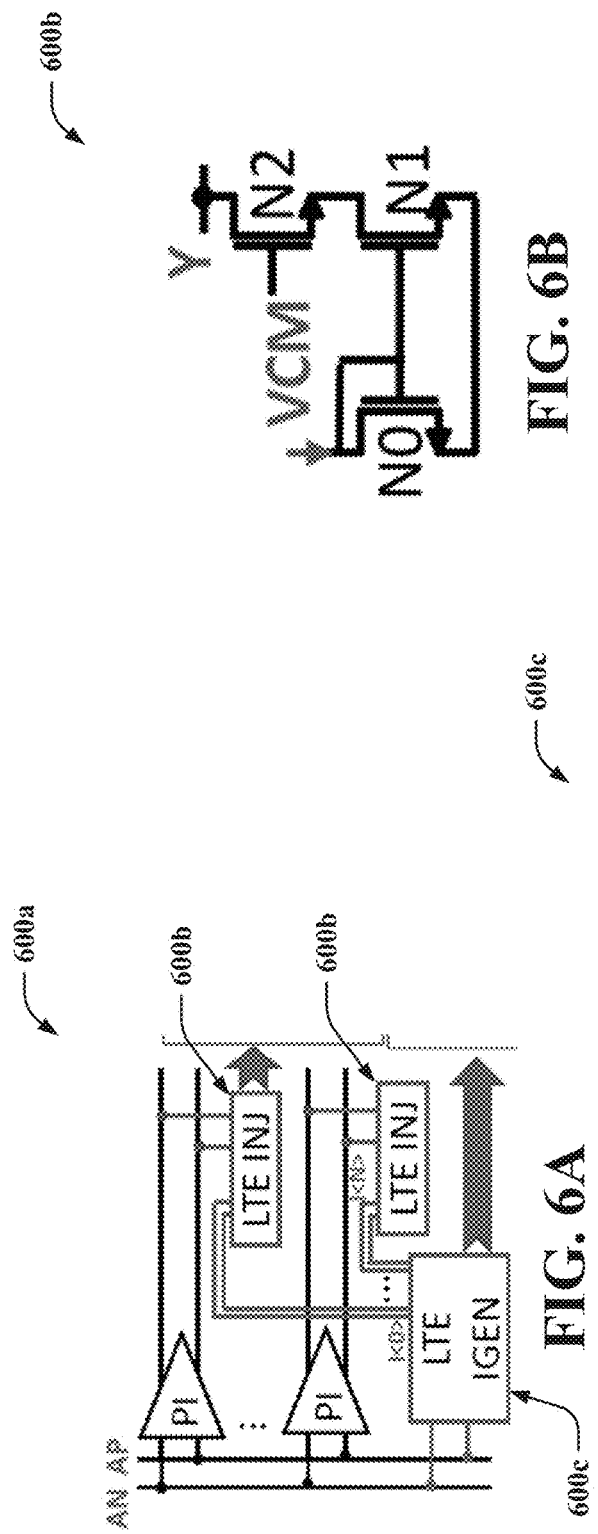
FIGS. 6B and 6C illustrate electrical schematics of example, non-limiting devices that can facilitate discrete time analog front end circuit components in accordance with one or more embodiments described herein.
Figure 6C:
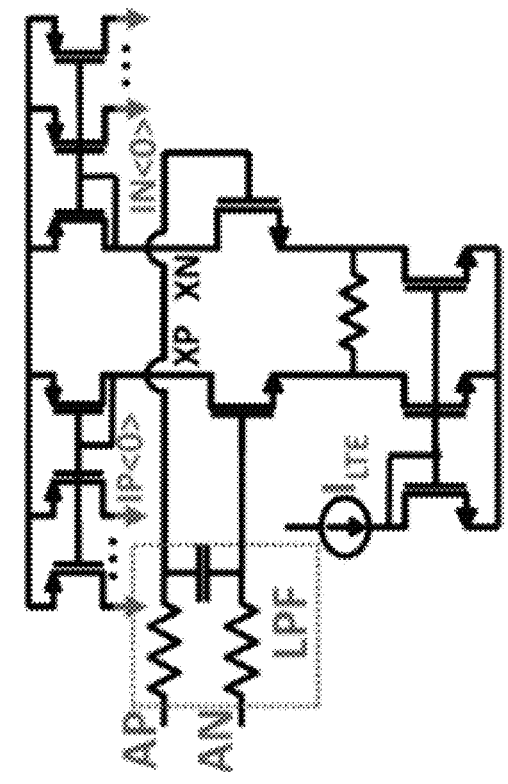

FIG. 6A illustrates a block diagram of an example, non-limiting device 600a that can facilitate discrete time analog front end circuit components in accordance with one or more embodiments described herein. FIGS. 6B and 6C illustrate electrical schematics of example, non-limiting devices 600b, 600c that can facilitate discrete time analog front end circuit components in accordance with one or more embodiments described herein. Repetitive description of like elements and/or processes employed in various embodiments described herein is omitted for sake of brevity.

In some embodiments, FIGS. 6A, 6B, 6C can illustrate example, non-limiting alternative embodiments of device 300a and/or low frequency equalizer circuit 302. In some embodiments, the LTE can provide equalization of the low frequency components of the channel response, which could require too many taps to be practically equalized by a discrete time FFE or decision feedback equalizer (DFE).

In some embodiments, a conventional approach can be used to provide passive LTE as an independent first stage. In some embodiments, another approach can comprise using an active current injection in the sampled stages (e.g., as depicted in FIGS. 6A, 6B, and 6C). In such embodiments, as the active signal is low pass filtered, it has a much lower bandwidth requirement than CTLE and/or VGA and its filtering can be implemented without need for inductors or other bandwidth extension techniques. In some embodiments, compared to the passive approach, lower frequencies can be achieved and the DC input impedance is not affected. In some embodiments, the LTE injector can add a DC current of +ILTE which can be used to adjust the common mode at the output of the integrator stage and/or can be compensated by using the injections scheme of device 500b depicted in FIG. 5B. In some embodiments, the nodes XP and/or XN in the circuit of device 600c can be directly connected to the integrating node Y, which can remove the need for LTE INJ device 600b and can require one LTE IGEN for each of the parallel instantiations of the peaked integrator (e.g., 4 instantiations in the case of a quarter-rate architecture).

In some embodiments, FIGS. 6A, 6B, and 6C, can represent an active LTE, where FIG. 6B can illustrate a schematic of the LTE injector (e.g., half circuit) and FIG. 6C can illustrate a schematic of the LTE current generator (IGEN). In some embodiments, the injector can be placed at the output of the PI or SI circuits. In some embodiments, the LTE can low-pass filter the input voltage and convert it to a current, which can then be mirrored and injected at the integration node, resulting in a voltage correction.

Figure 7:
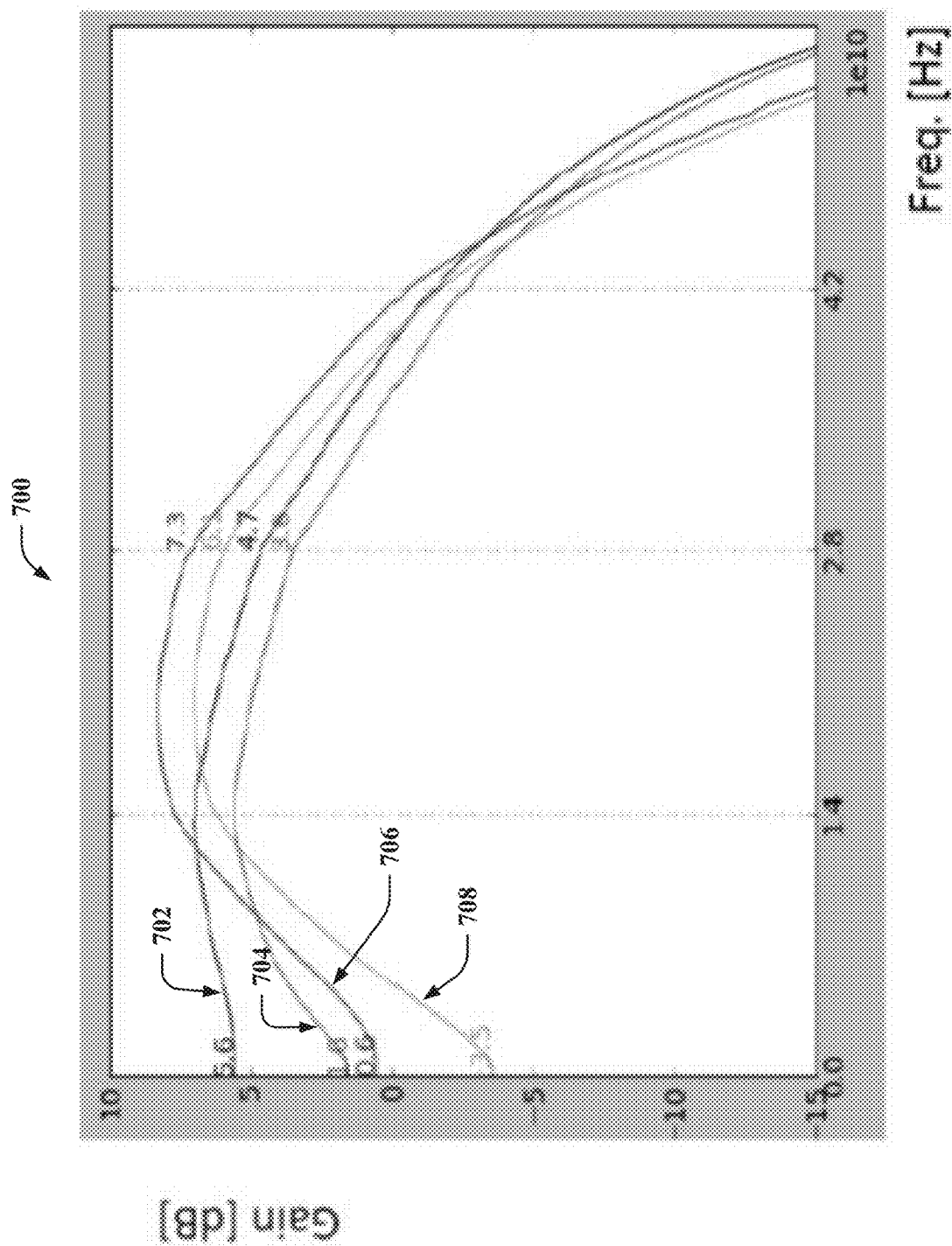
FIG. 7 illustrates example, non-limiting frequency response plots that can facilitate discrete time analog front end circuit components in accordance with one or more embodiments described herein.

FIG. 7 illustrates an example, non-limiting information 700 that can facilitate discrete time analog front end circuit components in accordance with one or more embodiments described herein. Repetitive description of like elements and/or processes employed in various embodiments described herein is omitted for sake of brevity.

In some embodiments, the subject disclosure (e.g., devices, 100a, 200a, 300a, 500a, etc.) can be implemented in a CMOS device (e.g., via a 7 nm lithography technology process) and used to validate performance of one or more embodiments of the subject disclosure as described herein. In these embodiments, information 700 can represent information obtained from such an implementation. For example, information 700 can illustrate the frequency response for different LTE and FFE settings. In some embodiments, information 700 can illustrate frequency response of the DTAFE described above with reference to device 300a without LTE or peaking (e.g., line plot 702), with LTE only (e.g., line plot 704), peaking only (e.g., line plot 706), and with LTE and peaking (e.g., line plot 708). In some embodiments, information 700 can illustrate schematic simulations of a CMOS device (e.g., via a 7 nm process), where Vdd=0.92V, T=50C, typical (TT) process, nominal process corner.

Figure 8A:
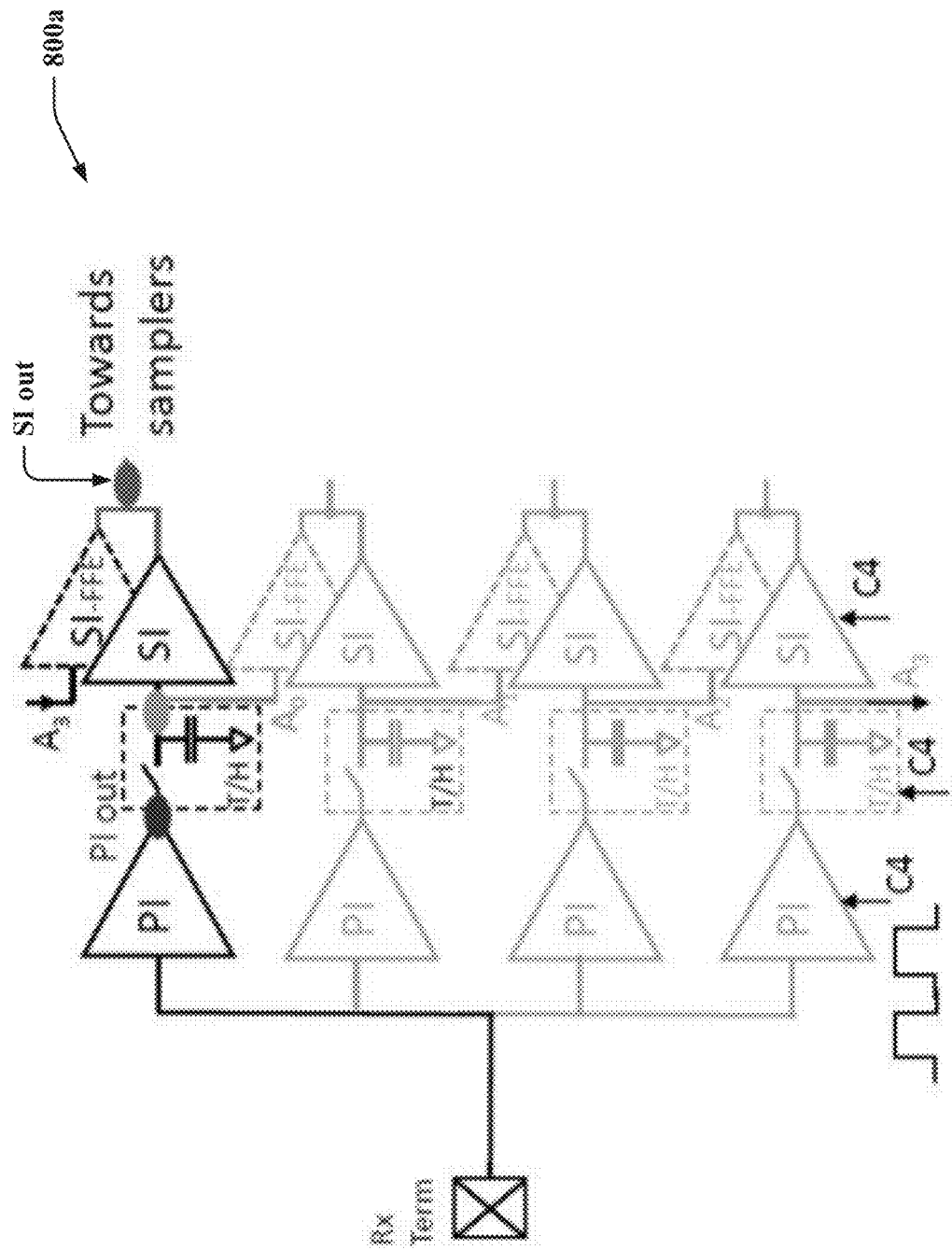
FIG. 8A illustrates a block diagram of an example, non-limiting device that can facilitate discrete time analog front end circuit components in accordance with one or more embodiments described herein.

FIG. 8A illustrates a block diagram of an example, non-limiting device 800a that can facilitate discrete time analog front end circuit components in accordance with one or more embodiments described herein. Repetitive description of like elements and/or processes employed in various embodiments described herein is omitted for sake of brevity.

In some embodiments, device 800a can comprise an example, non-limiting alternative embodiment of the subject disclosure (e.g., device 100a, 200a, 300a, etc.). For example, previously described embodiments can be suitable for links with moderate-to-high loss (e.g., Short Reach-Long Reach), which requires further equalization at 1/8-rate after the DTAFE. In some embodiments, Very Short Reach links can be equalized by the DTAFE only (e.g., device 200a). In such embodiments, there is no need to provide a conversion to 1/8-rate, but power requirements can be stricter. In some embodiments, a 2-level non-return-to-zero (NRZ) encoding can be used rather than a 4-level pulse amplitude modulation (PAM4). In such embodiments, the linearity requirements of the DTAFE can be further relaxed.

In some embodiments, device 800a can comprise a simplified embodiment of the DTAFE (e.g., embodiment of device 300a excluding device 302 and/or device 304), which can provide a lower power (at the cost of lower linearity) and 1/4-rate output only. In some embodiments, device 800a can also comprise circuit-level strategies which could be applied to the previously described embodiments of the subject disclosure (e.g., the DTAFE device 300a) to reduce power consumption of such embodiments, but potentially degrade linearity.

Figure 8B:
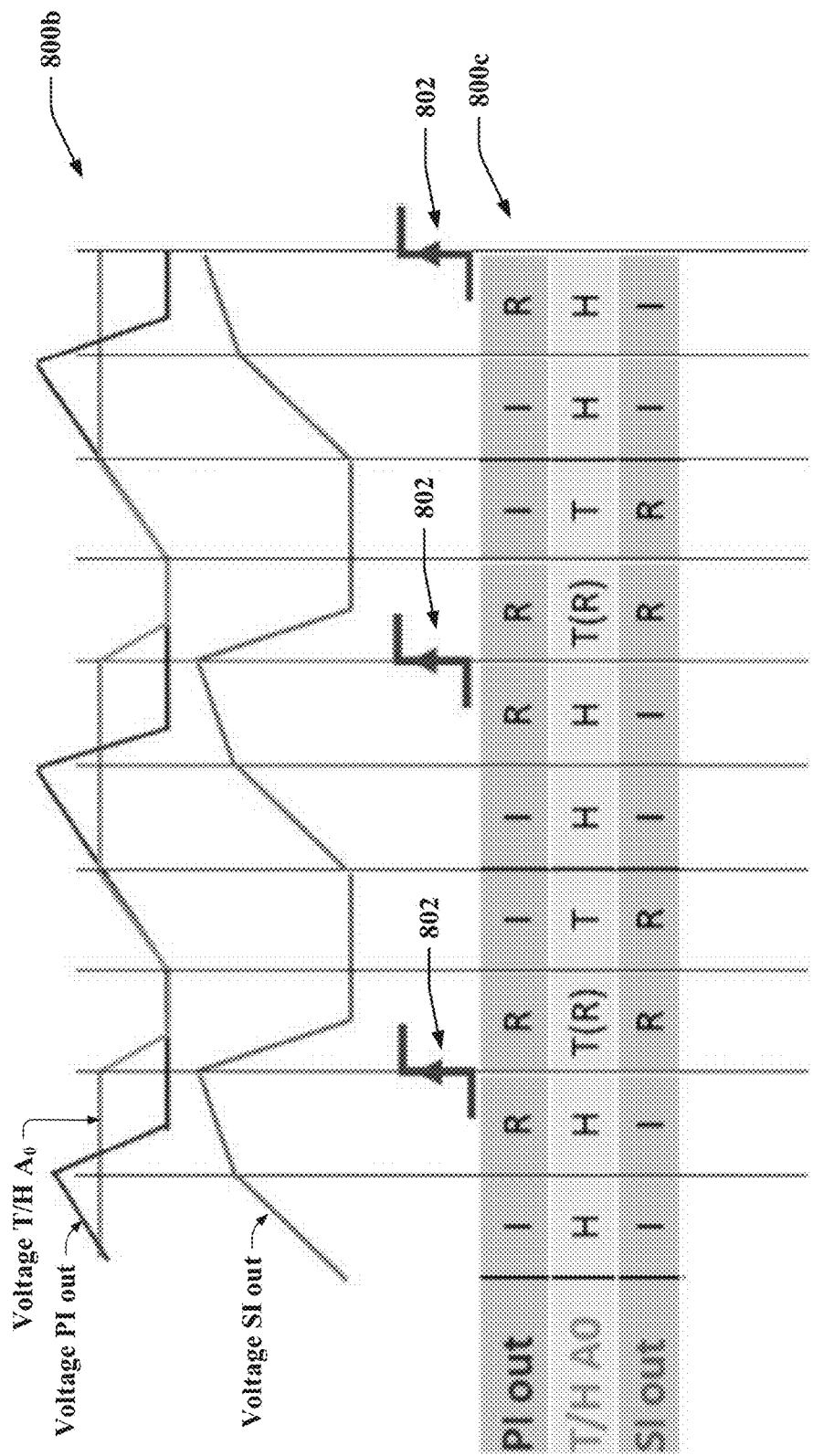
FIG. 8B illustrates an example, non-limiting timing diagram that can facilitate discrete time analog front end circuit components in accordance with one or more embodiments described herein.

FIG. 8B illustrates an example, non-limiting timing diagram 800b that can facilitate discrete time analog front end circuit components in accordance with one or more embodiments described herein. Repetitive description of like elements and/or processes employed in various embodiments described herein is omitted for sake of brevity.

According to multiple embodiments, timing diagram 800b can comprise an example, non-limiting alternative embodiment of timing diagram 100b, timing diagram 200b, and/or timing diagram 300b, where timing diagram 800b can represent a timing diagram corresponding to implementation (e.g., operation) of device 800a described above with reference to FIG. 8A. In some embodiments, timing diagram 800b can comprise voltage values corresponding to various nodes of device 800a during the different modes of operation as depicted in chart 800c (e.g., integration, tracking, holding, tracking of a reset input, and/or explicit reset phases). For example, timing diagram 800b can comprise voltage values including, but not limited to, voltage PI out, voltage T/H $A_0$, voltage SI Out, and/or another voltage value corresponding to another node of device 800a. In some embodiments, for instance, as illustrated in chart 800c, the system can operate on a quarter rate clock, hence all signals can have a period of 4UI. In these embodiments, the PI out, T/H $A_0$, and SI Out can operate on a similar timing as is depicted in FIG. 3B. In some embodiments, timing edge 802 can mark the sampling of the signal SI Out at the end of the integration step (e.g., denoted as I in chart 800c). In some embodiments, implementation of device 800a can eliminate the need of a C4 to C8 timing handoff (e.g., deserialization and signal delay circuit 304) and/or a source follower (SF) circuit 310 (e.g., reducing noise and/or power).

In some embodiments, the current injector described above with reference to FIG. 5B and device 500b can be replaced by a conventional DC-coupled injector for lower power but worse linearity.

FIG. 9A illustrates an electrical schematic of an example, non-limiting device 900a that can facilitate discrete time analog front end circuit components in accordance with one or more embodiments described herein. Repetitive description of like elements and/or processes employed in various embodiments described herein is omitted for sake of brevity.

In some embodiments, FIG. 9A can illustrate an example, non-limiting embodiment device 900a that can comprise an example of current switching between two opposite-phase peaked integrators (PI) or integrators (SI). In some embodiments, device 900a can comprise an example, non-limiting embodiment of a circuit that can be implemented in accordance with one or more embodiments described herein. In some embodiments, the PI, SI, and SI-FFE described above can be operated with current switched tails to reduce power.

In some embodiments, the device 900a can take advantage of the current switching to reduce power and/or to improve common-mode control at different points (e.g., as illustrated in FIGS. 9B and 9C). In some embodiments, in the PI, the tail current can be switched off after the $1^{st}$UI of integration to reduce un-necessary voltage drop 902 illustrated in FIG. 9B and voltage drop 904 illustrated in FIG. 9C. In some embodiments, in the SI-FFE, the current can be cut off after the $1^{st}$ UI too because the SI-FFE differential input can be 0 during the $2^{nd}$UI, so there is no need to integrate it at that point. In such embodiments, an additional benefit of device 900a can be that the tail current can be switched while the circuit is still in reset mode. In such embodiments, during the $1^{st}$UI, any remaining memory effect due to tail node capacitance can be cleared. In such embodiments, this mitigates the known issue of memory effect causing inter-symbol interference with current switched tails, as illustrated in FIG. 9A.

FIGS. 9B and 9C illustrate example, non-limiting timing diagrams 900b and 900c that can facilitate discrete time analog front end circuit components in accordance with one or more embodiments described herein. Repetitive description of like elements and/or processes employed in various embodiments described herein is omitted for sake of brevity. In some embodiments, timing diagrams 900b, 900c of FIGS. 9B and 9C, respectively, can illustrate timing of the current switching in the PI (e.g., timing diagram 900b of FIG. 9B) and/or SI and/or SI-FFE (e.g., timing diagram 900c of FIG. 9C), where dashed lines of such timing diagrams can represent conventional non-switched current $I_{on}$ and solid lines of such timing diagrams can represent that of device 900a (with current switching).

In some embodiments, the subject disclosure (e.g., device 100a, device 200a, device 300a, etc.) can be a device, system, and/or process associated with various technologies. For example, the subject disclosure (e.g., device 100a, device 200a, device 300a, etc.) can be associated with wireline device technologies, wireline device calibration technologies, signal processing technologies, signal conditioning technologies, data communication device technologies, broadband device technologies, broadband signal technologies, discrete time circuit technologies, discrete time analog circuit technologies, signal sampling technologies, computing device technologies, computing hardware technologies, integrated circuit technologies, semiconductor device fabrication technologies, and/or other technologies.

In some embodiments, the subject disclosure (e.g., device 100a, device 200a, device 300a, etc.) can provide technical improvements to systems, devices, components, operational steps, and/or processing steps associated with the various technologies identified above. For example, the subject disclosure (e.g., device 100a, device 200a, device 300a, etc.) can extend the discrete-time processing used in the later wireline receiver stages to provide a full Discrete Time Analog Front End (DTAFE), which can alleviate the bandwidth requirements while providing comparable gain and peaking functions to active Continuous Time Linear Equalizers (CTLE) and Variable Gain Amplifiers (VGA) in existing wireline receivers, while maintaining a full 25 GHz bandwidth without requiring use of bandwidth (BW) extension inductors, which increase design complexity, area (e.g., footprint), and/or power consumption.

In some embodiments, the subject disclosure (e.g., device 100a, device 200a, device 300a, etc.) can provide technical improvements to a data communication device (e.g., a broadband device, a wireline receiver, a wireline transceiver, etc.). For example, as described above, the subject disclosure can eliminate the need of continuous time analog elements (e.g., circuits), thereby facilitating reduced area (e.g., footprint) of such elements (e.g., circuits) by reducing the number of components, which can further reduce power consumed by such a data communication device.

In some embodiments, some of the processes described herein may be performed by one or more specialized data communication devices and/or computers for carrying out defined tasks related to in situ probing of a discrete time circuit. In some embodiments, the subject disclosure (e.g., device 100a, device 200a, device 300a, etc.) can be employed to solve new problems that arise through advancements in technologies mentioned above and/or another technology.

Figure 10:
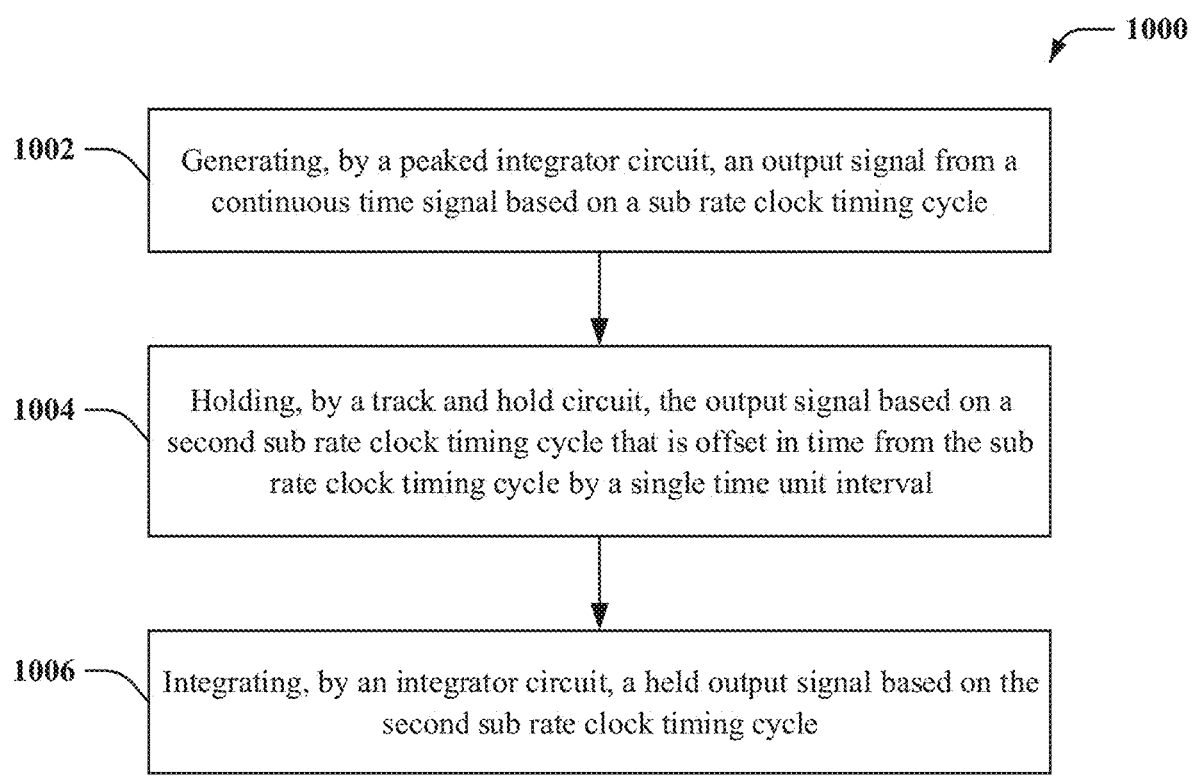
FIG. 10 illustrates a flow diagram of an example, non-limiting method that can facilitate discrete time analog front end circuit components in accordance with one or more embodiments described herein.

FIG. 10 illustrates a flow diagram of an example, non-limiting method 1000 that can facilitate discrete time analog front end circuit components in accordance with one or more embodiments described herein. Repetitive description of like elements and/or processes employed in respective embodiments is omitted for sake of brevity.

In some embodiments, at 1002, method 1000 can comprise generating, by a peaked integrator circuit (e.g., peaked integrator (PI) circuit 104, peaked integrator (PI) circuit 204, etc.), an output signal from a continuous time signal based on a sub rate clock timing cycle. In some embodiments, at 1004, method 1000 can comprise holding, by a track and hold circuit (e.g., track and hold (T/H) circuit 106, track and hold (T/H) circuit 206, etc.), the output signal based on a second sub rate clock timing cycle that is offset in time from the sub rate clock timing cycle by a single time unit interval. In some embodiments, at 1006, method 1000 can comprise integrating, by an integrator circuit (e.g., via integrator circuit 108, integrator circuit 208, etc.), a held output signal (e.g., the output signal held by, for instance, track and hold (T/H) circuit 106 or track and hold (T/H) circuit 206 described above) based on the second sub rate clock timing cycle.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
   a peaked integrator circuit that generates an output signal from a continuous time signal based on a sub rate clock timing cycle;
   a track and hold circuit coupled to the output of the peaked integrator that generates a held discrete time signal from the output of the peaked integrator based on a second sub rate clock timing cycle that is offset in time from the sub rate clock timing cycle by a single time unit interval; and
   an integrator circuit coupled to an output of the track and hold circuit that integrates the held discrete time signal, based on the second sub rate clock timing cycle that is offset in time from the sub rate clock timing cycle by a single time unit interval.

2. The device of claim 1, further comprising a feed forward equalizer circuit coupled to an output of the track and hold circuit that provides at least one of gain or peaking based on feed forward equalization levels.

3. The device of claim 2, wherein the feed forward equalizer circuit comprises:
a first integrator circuit coupled to an output of the track and hold circuit; and
a second integrator circuit coupled to an output of a second track and hold circuit that is coupled to an output of a second peaked integrator circuit, wherein an output of the first integrator circuit is coupled to an output of the second integrator circuit.

4. The device of claim 3, wherein the second peaked integrator circuit operates based on a third sub rate clock timing cycle that is earlier than the sub rate clock timing cycle by a single time unit interval, and wherein the first peaked integrator circuit and the second track and hold circuit operate based on the sub rate clock timing cycle, and wherein the first integrator circuit, the second integrator circuit, and the first track and hold circuit operate based on the delayed second sub rate clock timing cycle that is offset in time from the sub rate clock timing cycle by a single time unit interval.

5. The device of claim 1, further comprising a low frequency equalizer circuit coupled to an input of the peaked integrator circuit and output of the peaked integrator circuit or an output of the integrator circuit that equalizes one or more low frequency components of a channel response.

6. The device of claim 1, further comprising a current injector coupled to an output of the peaked integrator circuit or an output of the integrator circuit that injects a current at the output of the peaked integrator circuit or the output of the integrator circuit, wherein the current injector adjusts the common mode, and wherein the current can be programmed.

7. The device of claim 1, further comprising a deserialization and signal delay circuit coupled to an output of the integrator circuit that deserializes an output signal of the integrator circuit and provides multiple copies of delayed signals having different delayed sub rate clock timing cycles to support a subsequent feed forward equalizer circuit coupled to an output of the deserialization and signal delay circuit.

8. The device of claim 7, wherein the deserialization and signal delay circuit comprises:
two or more second track and hold circuits coupled to an output of the integrator circuit that operate in complementary phases; and
one or more voltage buffer circuits coupled to an output of the two or more second track and hold circuits, and wherein the two or more second track and hold circuits operate based on a lower rate clock timing cycle.

9. A method, comprising:
generating, by a peaked integrator circuit, an output signal from a continuous time signal based on a sub rate clock timing cycle;
holding, by a track and hold circuit, the output signal based on a second sub rate clock timing cycle that is offset in time from the sub rate clock timing cycle by a single time unit interval; and
integrating, by an integrator circuit, a held output signal based on the second sub rate clock timing cycle.

10. The method of claim 9, further comprising providing at least one of gain or peaking based on a feed forward equalization level.

11. The method of claim 9, further comprising equalizing one or more low frequency components of a channel response.

12. The method of claim 10, further comprising providing a desired common mode level of integrated signals independently of one or more feed forward equalization levels.

* * * * *